(12) United States Patent
Fukasawa

(10) Patent No.: US 9,851,892 B2
(45) Date of Patent: Dec. 26, 2017

(54) INFORMATION PROCESSING DEVICE, RECORDING MEDIUM, AND INFORMATION PROCESSING METHOD

(71) Applicant: Oki Electric Industry Co., Ltd., Tokyo (JP)

(72) Inventor: Shinichi Fukasawa, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 15/158,674

(22) Filed: May 19, 2016

(65) Prior Publication Data
US 2017/0019629 A1    Jan. 19, 2017

(30) Foreign Application Priority Data
Jul. 13, 2015    (JP) .................. 2015-139338

(51) Int. Cl.
*H04N 7/14* (2006.01)
*G06F 3/0488* (2013.01)
*H04L 12/18* (2006.01)
*H04M 3/56* (2006.01)
*H04L 12/58* (2006.01)

(52) U.S. Cl.
CPC ........ *G06F 3/0488* (2013.01); *H04L 12/1813* (2013.01); *H04L 12/1822* (2013.01); *H04L 51/043* (2013.01); *H04M 3/567* (2013.01)

(58) Field of Classification Search
None
See application file for complete search history.

(56) References Cited

U.S. PATENT DOCUMENTS

2005/0081160 A1*   4/2005  Wee .................. G06Q 10/10
715/755

FOREIGN PATENT DOCUMENTS

JP    2007-208863 A    8/2007
JP    2008-005450 A    1/2008

OTHER PUBLICATIONS

Japanese Office Action dated Sep. 6, 2016, with translation.
Gaver et at., "One is not enough: multiple views in a media space", in proceeding of INTERCHI'93, pp. 335-341, Apr. 24-29, 1993.

* cited by examiner

*Primary Examiner* — Maria El-Zoobi
(74) *Attorney, Agent, or Firm* — Rabin & Berdo, P.C.

(57) ABSTRACT

There is provided an information processing device including a position acquisition unit configured to acquire a selection position based on a specification of a user in a captured image obtained by imaging a real space, and a line control unit configured to cause a display unit to display a two-dimensional line obtained by projecting, onto a corresponding position on a display screen of the captured image, a three-dimensional line according to a three-dimensional selection position corresponding to the selection position in a three-dimensional virtual space and a three-dimensional installation position of an imaging device including the three-dimensional selection position within an imaging range.

15 Claims, 23 Drawing Sheets

INFORMATION PROCESSING DEVICE, RECORDING MEDIUM, AND INFORMATION PROCESSING METHOD

CROSS REFERENCE TO RELATED APPLICATION(S)

This application is based upon and claims benefit of priority from Japanese Patent Application No. 2015-139338, filed on Jul. 13, 2015, the entire contents of which are incorporated herein by reference.

BACKGROUND

An embodiment of the present invention relates an information processing device, a recording medium, and an information processing method.

Softphones implemented by application software have been recently gaining widespread use in place of conventional telephones implemented by hardware. Softphones are implemented by software, and it is thus relatively easy, for example, to add functions to the softphones and to make the softphones cooperate with other application software. A variety of applied techniques for softphones are consequently devised.

For example, JP 2007-208863A discloses a system including a plurality of cameras each configured to take an overhead view photograph of a floor, and a technique of recognizing the face of a person shown in a captured image acquired from the camera and identifying the person, acquiring the telephone number of the person, and making a telephone call to the person when the person is touched on the display screen of the captured image.

SUMMARY

However, although JP 2007-208863A certainly describes that the system has a function of switching the plurality of cameras, JP 2007-208863A describes nothing about the specifications of a user interface for an operation of switching the cameras.

The following describes a camera switching function of a remote communication support system, and the importance of an operation thereof.

A user who makes a telephone call to a call target person at a remote place can learn presence information on the call target person by watching video of the remote place immediately before making a call to the call target person. The presence information shows the situation of the target, and it is preferable that the information be superior in both quality and quantity. The presence information of higher quality allows a user to grasp not only a rough situation like whether or not the call target person is present, but also a more sophisticated situation on the call target person like whether or not the call target person looks busy at present, whether or not the call target person is going to leave the seat, and the like. This consequently facilitates the user who makes a call to speak to the call target person, while the call target person is less frequently spoken to when the call target person does not want to be spoken to in inconvenient situations. Accordingly, this offers useful effects to both of them.

To grasp not just a rough situation like whether or not the call target person is present, but a more sophisticated situation as described above (i.e. to see how it goes) in a remote environment effectively, there has to be provided a system function that makes it possible to observe the physical conditions of the call target person from diverse standpoints. It is preferable that the above-described remote communication support system have a plurality of cameras to implement that function, but this is not enough.

This is because there is a conventional problem (spatial discontinuities) that if a user switches a plurality of cameras installed at a remote place, the user fails to grasp the positional relationship between the plurality of cameras and gets confused about where the user is watching at present through which camera and which camera the user should select next to watch a desired target/position (Gayer et al., One is not enough: multiple views in a media space, in Proceedings of INTERCHI'93, pp. 335-341).

Accordingly, it is desirable to provide a user interface that solves the problem with the positional relationship between the plurality of cameras, and allows a user who makes a call to perform an intuitive and effective operation and to grasp a sophisticated situation of a call target person at a remote place with ease.

According to an embodiment of the present invention, there is provided an information processing device including: a position acquisition unit configured to acquire a selection position based on a specification of a user in a captured image obtained by imaging a real space; and a line control unit configured to cause a display unit to display a two-dimensional line obtained by projecting, onto a corresponding position on a display screen of the captured image, a three-dimensional line according to a three-dimensional selection position corresponding to the selection position in a three-dimensional virtual space and a three-dimensional installation position of an imaging device including the three-dimensional selection position within an imaging range.

The line control unit may compute the two-dimensional line by projecting the three-dimensional line according to the three-dimensional installation position and the three-dimensional selection position onto the corresponding position on the display screen.

The information processing device may include: a real space information providing unit configured to cause the display unit to display a captured image that is captured by an imaging device corresponding to the two-dimensional line when the two-dimensional line is specified.

When a position on the two-dimensional line is further specified as a specification position, the line control unit may compute a zoom ratio on the basis of a positional relationship between both end positions of the two-dimensional line and the specification position, and the real space information providing unit may generate the captured image on the basis of the zoom ratio.

The line control unit may perform predetermined transformation processing according to the specification position on the two-dimensional line, and may cause the display unit to display the two-dimensional line on which the transformation processing has been performed.

The information processing device may include: a line sorting unit configured to, when a plurality of imaging devices that include the three-dimensional selection position within the imaging ranges are present, sort a three-dimensional line on the basis of an evaluation value of the three-dimensional line of each imaging device, and to cause the display unit to display a two-dimensional line obtained by projecting the sorted three-dimensional line onto the corresponding position on the display screen.

The line sorting unit may compute the evaluation value of each three-dimensional line on the basis of a distance between the three-dimensional selection position and the three-dimensional installation position.

The line sorting unit may compute the evaluation value of each three-dimensional line on the basis of an angle formed by the three-dimensional line and a horizontal plane in the three-dimensional virtual space.

The line sorting unit may compute the evaluation value of each three-dimensional line on the basis of an imaging quality of the imaging device corresponding to the three-dimensional line.

The line sorting unit may cause the display unit to display a two-dimensional line obtained by projecting the sorted three-dimensional line onto the corresponding position on the display screen, and may cause the display unit to display a total number of three-dimensional lines.

The line sorting unit may acquire the imaging quality of the imaging device by analyzing the captured image that is captured by the imaging device, or may acquire the imaging quality of the imaging device on the basis of information embedded in the captured image that is captured by the imaging device.

The line control unit may cause the display unit to display the three-dimensional line corresponding to the imaging device in a display manner according to an imaging quality of the imaging device.

The three-dimensional installation position of the imaging device may include a position that allows an interpolation image to be captured, the interpolation image being generated from a captured image of each of a plurality of imaging devices in an interpolative manner.

When a part of the three-dimensional line is not projected onto an inside of the captured image, the line control unit does not have to cause the display unit to display a result obtained by projecting the part onto the corresponding position on the display screen.

In addition, according to an embodiment of the present invention, there is provided a computer-readable recording medium having a program recorded thereon, the program causing a computer to function as an information processing device including a position acquisition unit configured to acquire a selection position based on a specification of a user in a captured image obtained by imaging a real space, and a line control unit configured to cause a display unit to display a two-dimensional line obtained by projecting, onto a corresponding position on a display screen of the captured image, a three-dimensional line according to a three-dimensional selection position corresponding to the selection position in a three-dimensional virtual space and a three-dimensional installation position of an imaging device including the three-dimensional selection position within an imaging range.

In addition, according to an embodiment of the present invention, there is provided an information processing method including: acquiring a selection position based on a specification of a user in a captured image obtained by imaging a real space; and causing a display unit to display a two-dimensional line obtained by projecting, onto a corresponding position on a display screen of the captured image, a three-dimensional line according to a three-dimensional selection position corresponding to the selection position in a three-dimensional virtual space and a three-dimensional installation position of an imaging device including the three-dimensional selection position within an imaging range.

According to an embodiment of the present invention as described above, it is possible to develop a novel user interface of a remote communication support system. This solves the problem that a user fails to grasp the positional relationship between a plurality of cameras at a remote place and gets cognitively confused, and allows a user who makes a call to perform an intuitive and effective operation and to learn a sophisticated situation of a call target at the remote place with ease, thereby realizing a more excellent remote communication environment.

DETAILED DESCRIPTION OF THE EMBODIMENT(S)

Figure 1:
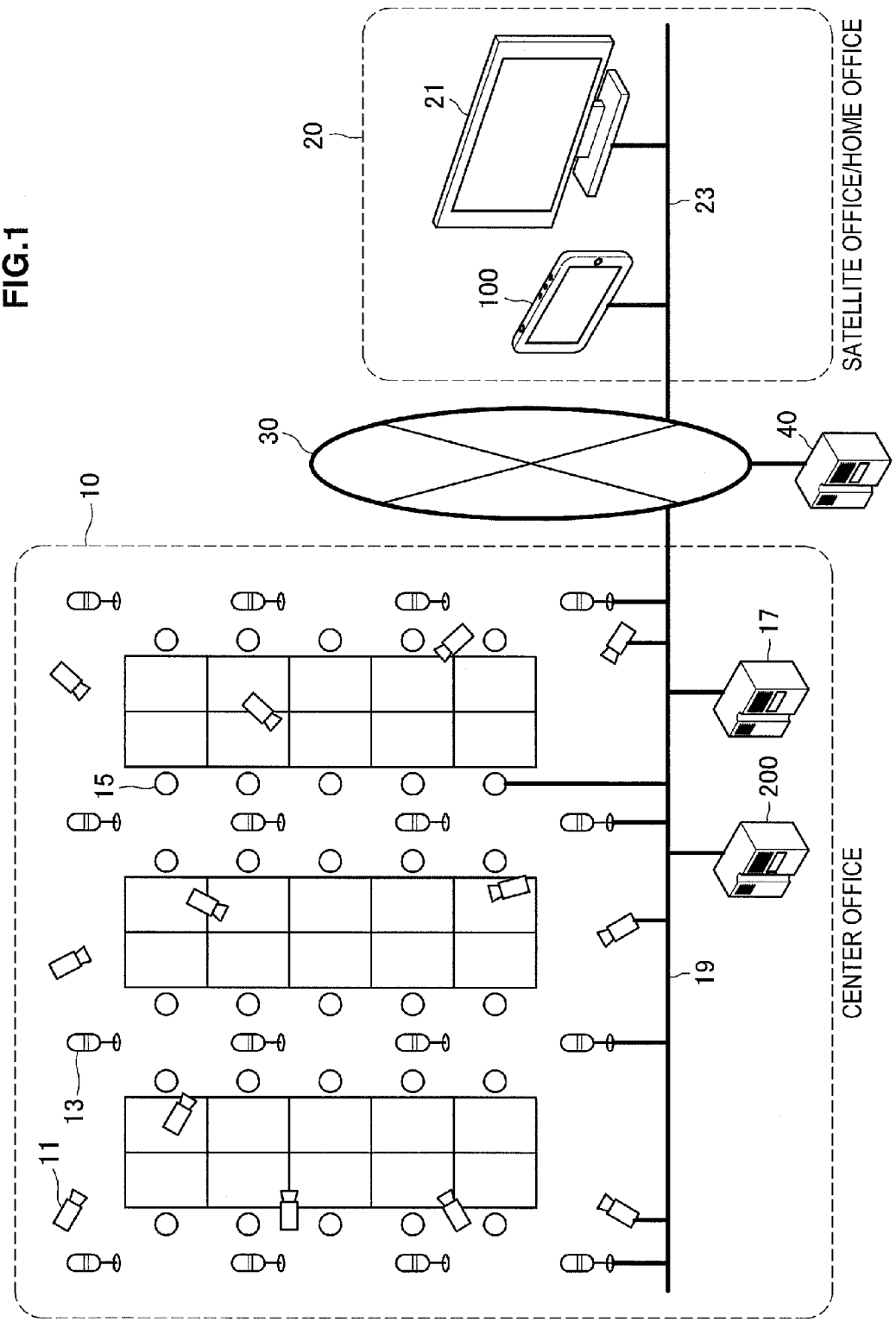
FIG. 1 is an explanatory diagram illustrating an example of a schematic configuration of an information processing system according to an embodiment.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

An embodiment of the present invention will be described below in the order of <1. Schematic Configuration of Information Processing System>, <2. Configuration of Terminal Device>, <3. Configuration of Information Management Server>, <4. Processing Steps>, and <5. Modifications>.

<<1. Schematic Configuration of Information Processing System>>

First of all, the schematic configuration of an information processing system according to an embodiment of the present invention will be described with reference to FIG. 1. FIG. 1 is an explanatory diagram illustrating an example of a schematic configuration of an information processing system according to the present embodiment. FIG. 1 illustrates that the information processing system includes, for example, a plurality of bases. The information processing system includes a center office 10 and a satellite office 20 (or a home office 20) in this example. The center office 10 is a relatively large-scale office, while the satellite office 20 (or the home office 20) is a relatively small-scale office.

The information processing system includes a camera 11, a microphone 13, a sensor 15, a media distribution server 17, an information management server 200, and a local area network (LAN) 19 in the center office 10. Meanwhile, the information processing system includes a terminal device 100, a display 21, and a LAN 23 in the satellite office 20 (or the home office 20). The information processing system further includes a private branch exchange (PBX) 40.

(Camera 11)

The camera 11 images an area in the direction (i.e. imaging direction) in which the camera 11 faces. The center office 10 has a plurality of cameras 11 installed therein. The installed cameras 11 image a part or the whole of the center office from the respective installation position. The center office is imaged from a variety of positions in this way in the information processing system. Captured images generated through the cameras 11 may be still images or moving images (i.e. video).

The cameras 11 can, for example, turn around automatically. Furthermore, the cameras 11 each have, for example, a zoom function. The zoom function may be an optical zoom function or a digital zoom function.

The cameras 11 may change their positions. As an example, the cameras 11 may be movable by dollies. In other words, the cameras 11 may be movable along rails. In this case, the cameras 11 may move back and forth under the control of motors that move the cameras 11 along rails. This makes it possible to generate captured images that show a subject imaged from different positions with a single camera 11 alone.

The zoom function may be a zoom function performed by changing the position of the camera 11 if the camera 11 can change its position. As an example, the zoom function may be a zoom function performed by using a dolly. For example, the camera 11 may be moved toward a subject to zoom in on the subject, while the camera 11 may be moved in the direction away from the subject to zoom out. Zoom using a dolly does not have to be fine zoom like optical zoom and digital zoom. For example, the camera 11 only has to generate a captured image that shows a subject larger in zooming in, while the camera 11 only has to generate a captured image that shows the subject smaller in zooming out.

(Microphone 13)

The microphone 13 collects sounds around the microphone 13. The center office 10 has a plurality of microphones 13 installed therein. The installed microphones 13 collect sounds around the respective installation positions in the center office. Sounds are collected at a variety of positions in the center office 10 in this way in the information processing system.

(Sensor 15)

The sensor 15 may include various types of sensor. For example, the sensor 15 includes a seat sensor that determines whether or not a person is sitting on the seat. The seat sensor is installed on each seat, and determines whether or not a person is sitting on each seat. The seat sensor is a sensor that can, for example, detect pressure.

(Media Distribution Server 17)

The media distribution server 17 may distribute media (such as audio and video) to a terminal device in response to a request.

(Information Management Server 200)

The information management server 200 manages various kinds of information used in the information processing system. In other words, the information management server 200 stores and timely updates the various kinds of information.

For example, the information management server 200 manages parameters for the camera 11, the microphone 13, and the sensor 15. Specifically, the information management server 200, for example, stores and updates information such as the installation position, the imaging direction (such as the direction vertical to the lens of the camera), and the zoom ratio of the camera 11 as parameters of the camera 11.

In addition, for example, the information management server 200 manages data of the three-dimensional virtual space corresponding to a real space. The three-dimensional virtual space is, for example, modeled after the center office 10. There are objects disposed in the three-dimensional virtual space. For example, the objects each correspond to a person. The objects are then disposed at the respective three-dimensional virtual positions in the three-dimensional virtual space, the three-dimensional virtual positions corresponding to the respective seats in the center office 10. In other words, when a person is sitting on the seat, the object is disposed at the three-dimensional virtual position at which the person is supposed to be. As an example, the object is a cylindrical object. The three-dimensional virtual space will be discussed below.

(LAN 19)

The LAN 19 is a network that connects devices in the center office 10 to each other. In addition, the LAN 19 connects each device in the center office 10 to a device outside the center office 10 via an external network 30. The external network 30 includes, for example, the Internet.

(Terminal Device 100)

The terminal device 100 is used by a user. For example, the terminal device 100 provides functions to the user for communication such as the telephone and e-mail. The terminal device 100 is a tablet terminal as an example. Additionally, the terminal device 100 may be another device such as a smartphone, a personal computer (PC), and a telephone equipped with a display each of which has a display function and a communication function instead of the tablet terminal.

(Display 21)

The display 21 displays a screen. For example, the display 21 displays a screen including a captured image generated through the camera 11. This allows a great number of people including a user of the terminal device 100 to watch the inside of the center office via the display 21.

In addition, for example, the display 21 also outputs audio. For example, the display 21 outputs audio collected by the microphone 13. This allows a great number of people including a user of the terminal device 100 to listen to sounds inside the center office via the display 21.

(LAN 23)

The LAN 23 is a network that connects devices in the satellite office 20 (or the home office 20) to each other. In addition, the LAN 23 connects each device in the satellite office 20 to a device outside the satellite office 20 via an external network 30.

(PBX 40)

The PBX 40 allows devices to communicate with each other via the external network 30. The PBX 40 operates, for example, in compliance with the H.323 or session initial protocol (SIP).

Specifically, for example, the PBX 40 stores communication identification information (such as telephone numbers) and Internet protocol (IP) addresses in association with each other. The PBX 40 then converts the communication identification information into an IP address in response to a request, and provides the IP address to the requestor.

Additionally, the PBX 40 may be connected to the LAN 19 or the LAN 23.

<<2. Configuration of Terminal Device>>

Next, an example of the configuration of the terminal device 100 according to the present embodiment will be described with reference to FIGS. 2 to 19.

<2-1. Hardware Configuration>

Figure 2:
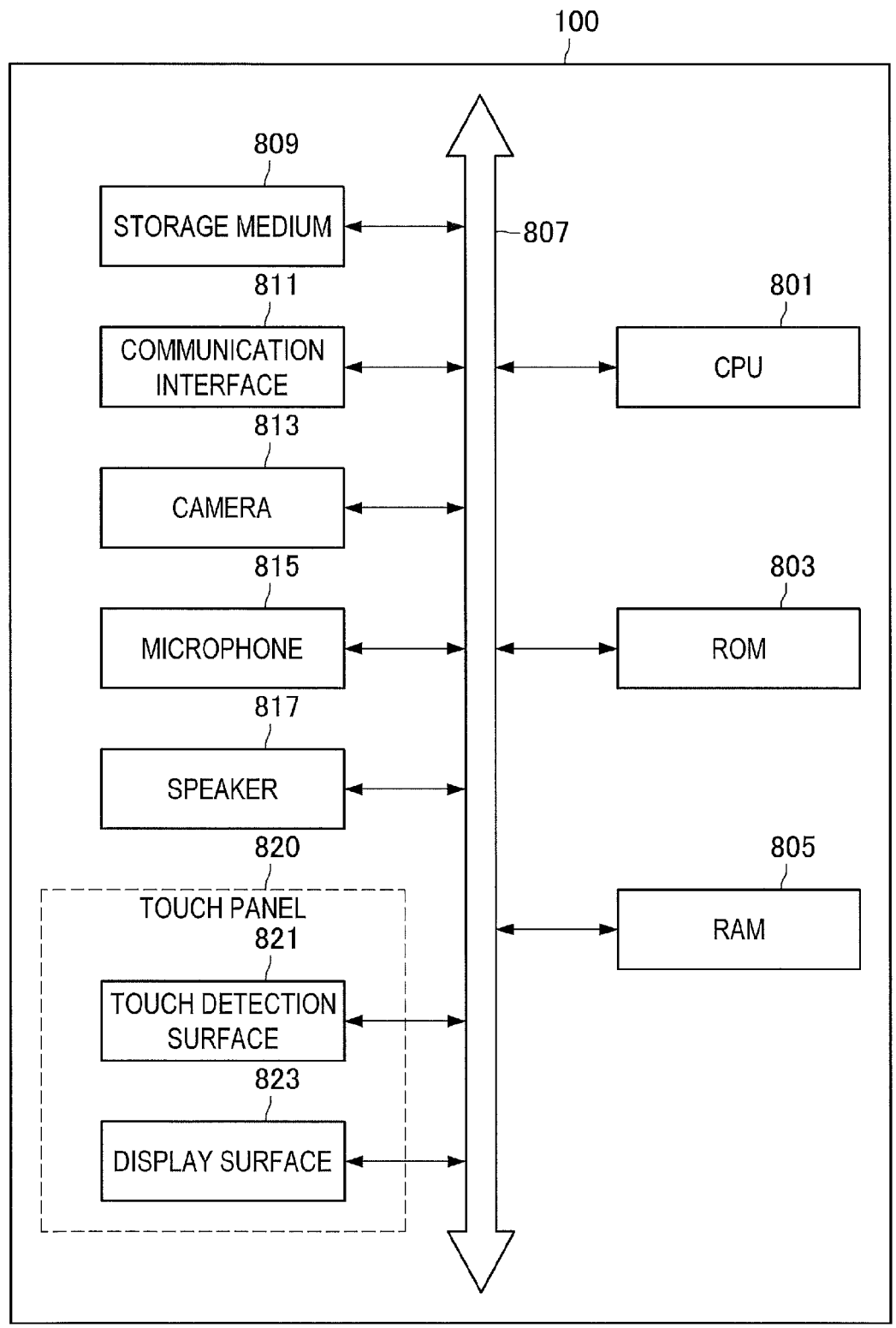
FIG. 2 is a block diagram illustrating an example of a hardware configuration of a terminal device according to an embodiment.

First of all, an example of the hardware configuration of the terminal device 100 according to the present embodiment will be described with reference to FIG. 2. FIG. 2 is a block diagram illustrating an example of the hardware configuration of the terminal device 100 according to the present embodiment. FIG. 2 illustrates that the terminal device 100 includes a central processing unit (CPU) 801, read only memory (ROM) 803, random access memory (RAM) 805, a bus 807, a storage device 809, a communication interface 811, a camera 813, a microphone 815, a speaker 817, and a touch panel 820.

The CPU 801 executes various kinds of processing in the terminal device 100. The ROM 803 stores a program and data that make the CPU 801 execute the processing in the terminal device 100. Meanwhile, the RAM 805 temporarily stores a program and data when the CPU 801 executes the processing.

The bus 807 connects the CPU 801, the ROM 803, and the RAM 805 to each other. The bus 807 is further connected to the storage device 809, the communication interface 811, the camera 813, the microphone 815, the speaker 817, and the touch panel 820. The bus 807 includes, for example, some types of bus. The bus 807 includes a high-speed bus that connects the CPU 801, the ROM 803 and the RAM 805 to each other, and one or more other buses that are lower than the high-speed bus in speed as an example.

The storage device 809 stores data that are to be temporarily or permanently saved in the terminal device 100. For example, the storage device 809 may be a magnetic storage device such as a hard disk, or nonvolatile memory such as electrically erasable and programmable read only memory (EEPROM), flash memory, magnetoresistive random access memory (MRAM), ferroelectric random access memory (FeRAM), and phase change random access memory (PRAM).

The communication interface 811 is a communication means included in the terminal device 100, and communicates with an external device via a network (or directly). The communication interface 811 may be an interface for wireless communication. In this case, the communication interface 811 may include, for example, a communication antenna, an RF circuit, and other communication processing circuits. The communication interface 811 may be an interface for wired communication. In this case, the communication interface 811 may include, for example, a LAN terminal, a transmission circuit, and other communication processing circuits.

The camera 813 images a subject. The camera 813 may include, for example, an optical system, an image sensor, and an image processing circuit.

The microphone 815 collects sounds around the microphone 815. The microphone 815 converts the sounds around the microphone 815 into electrical signals, and converts the electrical signals into digital data.

The speaker 817 outputs audio. The speaker 817 converts the digital data into electrical signals, and converts the electrical signals into audio.

The touch panel 820 includes a touch detection surface 821 and a display surface 823.

The touch detection surface 821 detects a touch position on the touch panel 820. More specifically, for example, when a user touches the touch panel 820, the touch detection surface 821 senses the touch, generates electrical signals according to the touch position, and then converts the electrical signals into information on the touch position. The touch detection surface 821 may be made by given touch detection technology such as capacitive touch detection technology, resistive touch detection technology, and optical touch detection technology.

An output image (i.e. display screen) from the terminal device 100 is displayed on the display surface 823. The display surface 823 may be made by using, for example, liquid crystal, organic EL (organic light-emitting diodes: OLEDs), and a cathode ray tube (CRT).

<2-2. Functional Configuration>

Figure 3:
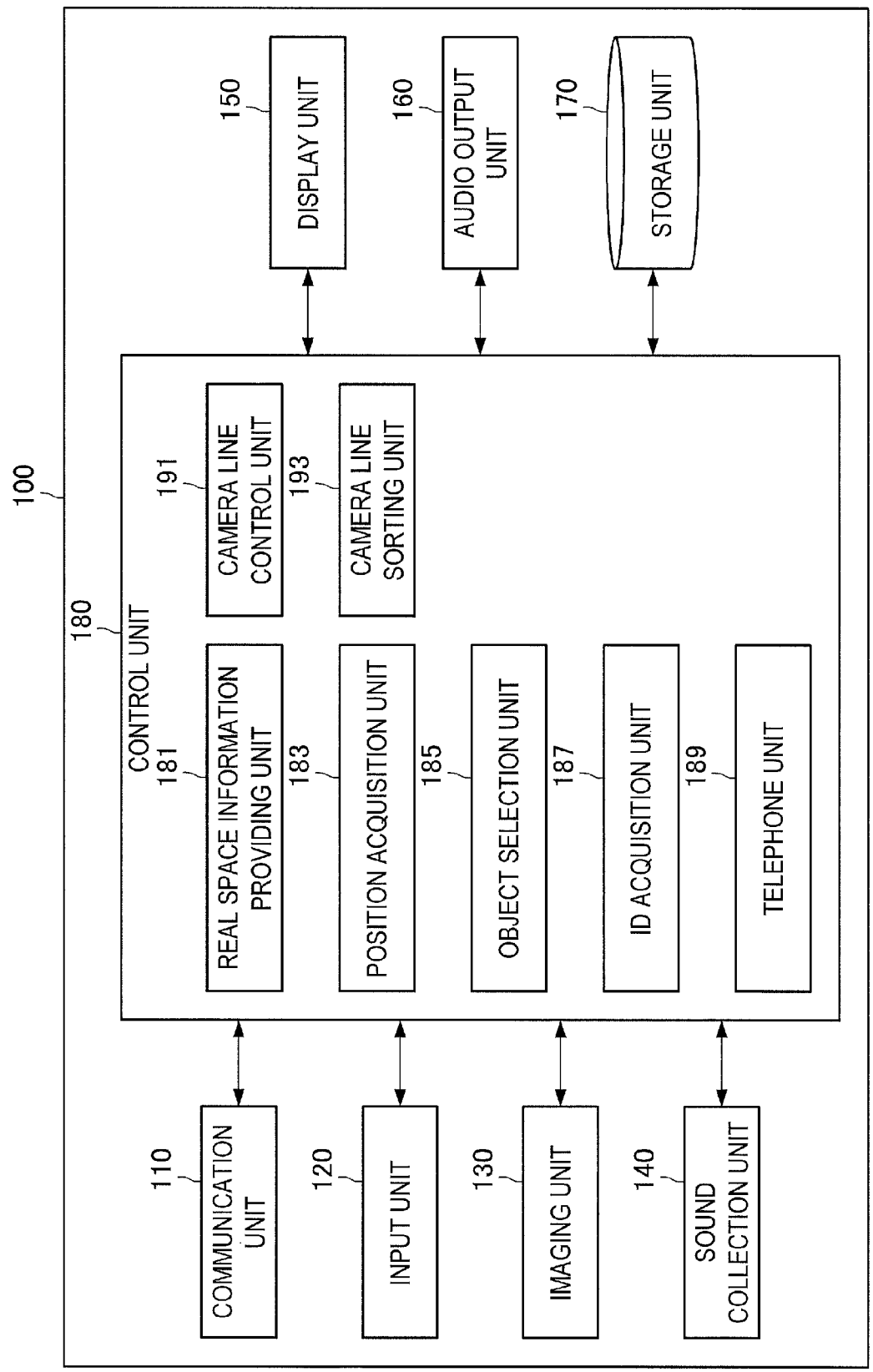
FIG. 3 is a block diagram illustrating an example of a functional configuration of a terminal device according to an embodiment.

Next, an example of the functional configuration of the terminal device 100 according to the present embodiment will be described. FIG. 3 is a block diagram illustrating an example of the functional configuration of the terminal device 100 according to the present embodiment. FIG. 3 illustrates that the terminal device 100 includes a communication unit 110, an input unit 120, an imaging unit 130, a sound collection unit 150, a display unit 150, an audio output unit 160, a storage unit 170, and a control unit 180.

(Communication Unit 110)

The communication unit 110 communicates with another device. For example, the communication unit 110 is directly connected to the LAN 23, and communicates with each device in the satellite office 20. The communication unit 110 also communicates with each device in the center office 10 via the external network 30 and the LAN 19. Specifically, for example, the communication unit 110 communicates with the camera 11, the microphone 13, the sensor 15, the media distribution server 17, and the information management server 200. Additionally, the communication unit 110 may be implemented, for example, by the communication interface 811.

(Input Unit 120)

The input unit 120 receives an input made by a user of the terminal device 100. The input unit 120 then provides a result of the input to the control unit 180.

For example, the input unit 120 detects a position specified by the user on the display screen. More specifically, for example, the input unit 120 is implemented by the touch detection surface 821, and detects a touch position on the touch panel 820. The input unit 120 then provides the detected touch position to the control unit 180.

(Imaging Unit 130)

The imaging unit 130 images a subject. For example, the imaging unit 130 images an area in the front direction of the terminal device 100. In this case, the imaging unit 130 images a user of the terminal device 100. The imaging unit 130 provides an imaging result (i.e. captured image) to the control unit 180. Additionally, the imaging unit 130 may be implemented, for example, by the camera 813.

(Sound Collection Unit 140)

The sound collection unit 140 collects sounds around the terminal device 100. For example, the sound collection unit 140 collects the voice of a user of the terminal device 100. The sound collection unit 140 provides a sound collection result (i.e. audio data) to the control unit 180. Additionally, the sound collection unit 140 may be implemented, for example, by the microphone 815.

(Display Unit 150)

An output image (i.e. display screen) from the terminal device 100 is displayed on the display unit 150. The display unit 150 displays a display screen in accordance with control exerted by the control unit 180. Additionally, the display unit 150 may be implemented, for example, by the display surface 823.

(Audio Output Unit 160)

The audio output unit 160 outputs audio from the terminal device 100. The audio output unit 160 outputs audio in accordance with control exerted by the control unit 180. Additionally, the audio output unit 160 may be implemented, for example, by the speaker 817.

(Storage Unit 170)

The storage unit 170 stores a program and data for the operation of the terminal device 100. Additionally, the storage unit 170 may be implemented, for example, by the storage device 809.

For example, the storage unit 170 stores data of the three-dimensional virtual space corresponding to a real space. Specifically, for example, the information management server 200 stores data of the three-dimensional virtual space corresponding to the center office 10, and then the control unit 180 acquires the data of the three-dimensional virtual space via the communication unit 110. The storage unit 170 stores the acquired data of the three-dimensional virtual space.

(Control Unit 180)

The control unit 180 provides a variety of functions of the terminal device 100. The control unit 180 includes a real space information providing unit 181, a position acquisition unit 183, an object selection unit 185, an ID acquisition unit 187, a telephone unit 189, a camera line control unit 191, and a camera line sorting unit 193. Additionally, the control unit 180 may be implemented, for example, by the CPU 801, the ROM 803, and the RAM 805.

(Real Space Information Providing Unit 181)

The real space information providing unit 181 provides information on the real space to a user of the terminal device 100.

For example, the real space information providing unit 181 causes the display unit 150 to display a display screen of a captured image showing a real space. More specifically, for example, the captured image is generated through the camera 11 in the real space (center office 10). The captured image may be generated by the camera 11 or generated by processing the captured image generated by the camera 11. The display screen partially or entirely includes the captured image.

The real space information providing unit 181 acquires a captured image generated by the camera 11 via the communication unit 110. The real space information providing unit 181 then generates a display screen including the captured image, and causes the display unit 150 to display the display screen.

In addition, the captured image is, for example, generated through a single imaging device selected from a plurality of imaging devices in the real space. More specifically, for example, the captured image is generated through a single camera 11 selected from the plurality of cameras 11 disposed in the center office 10. The following describes a specific technique by which a user selects a camera 11. Since a user can select the camera 11, the user can watch an image captured at a desired position. As discussed below, when a user specifies the position of a captured image, the user can specify the position with a more desired captured image.

For example, the display screen includes a captured image according to a display mode. More specifically, for example, the display screen includes a first captured image obtained by imaging a first area of a real space in a first display mode, while the display screen includes a second captured image obtained by imaging a second area narrower than the first area in a second display mode. In other words, the real space information providing unit 181 causes the display unit 150 to display the first captured image in the first display mode, and causes the display unit 150 to display the second captured image in the second display mode.

More specifically, for example, the first captured image corresponds to a first zoom ratio. Meanwhile, the second captured image corresponds to a second zoom ratio greater than the first zoom ratio. For example, the real space information providing unit 181 makes a zoom request (request to use optical zoom or digital zoom, or to zoom by changing the position of the imaging device (e.g. to zoom by using a dolly)) to the camera 11 via the communication unit 110, thereby acquiring a captured image corresponding to the first zoom ratio or a captured image corresponding to the second zoom ratio. Alternatively, the real space information providing unit 181 may use digital zoom for a captured image generated by the camera 11 to generate a captured image corresponding to the first zoom ratio or a captured image corresponding to the second zoom ratio. Additionally, the zoom ratio does not have to take a precise value such as a 1.5-fold magnification and a 2-fold magnification, but only has to directly or indirectly indicate the approximate size of a subject that can be included in the captured image. For example, especially when the position of the camera 11 is changed to zoom (e.g. to zoom in and out by using a dolly), the zoom ratio does not have to take a precise value such as a 1.5-fold magnification and a 2-fold magnification, but only has to directly indicate the approximate size of a subject (e.g. in the form of a parameter indicating the approximate size of the subject) or indirectly indicate the approximate size of the subject (e.g. in the form of the position of the camera 11 on the rail). The captured image corresponding to the first zoom ratio only has to show the subject smaller, while the captured image corresponding to the second zoom ratio greater than the first zoom ratio only has to show the subject larger.

As an example, the display screen includes a captured overhead view image generated by the camera 11 through imaging at an X-fold zoom ratio (e.g. X=1) in the overhead view mode, while the display screen includes a captured proximity image generated by the camera 11 through imaging at a Y-fold zoom ratio (Y>X) in the proximity mode. In other words, the captured overhead view image is obtained by imaging a wider area of the center office 10, while the captured proximity image is obtained by imaging a narrower area of the center office 10. The following describes a specific example on this point with reference to FIGS. 4 and 5.

Display Screen Displayed in Overhead View Mode

Figure 4:
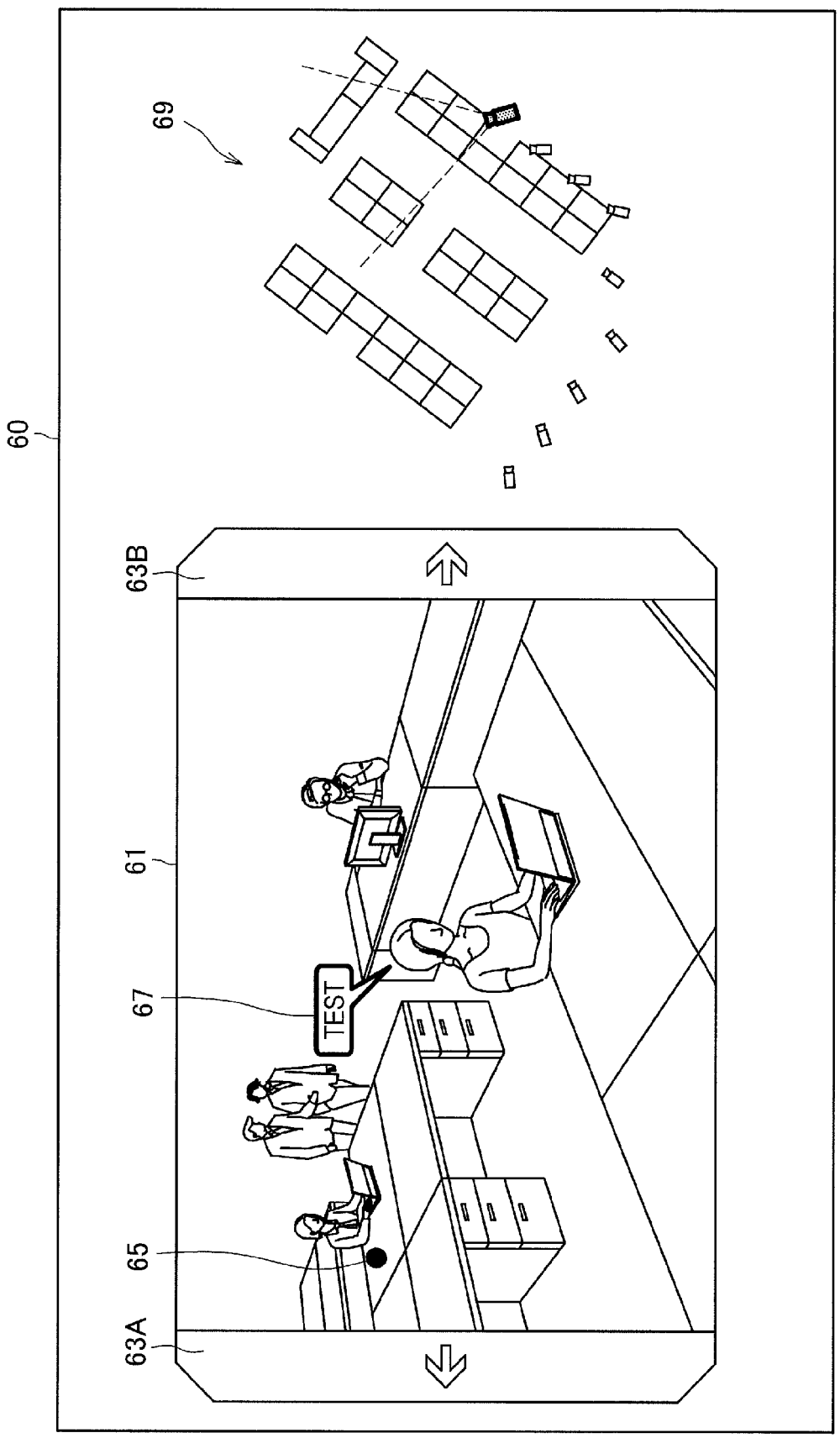
FIG. 4 is an explanatory diagram for describing an example of a display screen displayed in an overhead view mode.

FIG. 4 is an explanatory diagram for describing an example of a display screen displayed in the overhead view mode. FIG. 4 illustrates a display screen 60 that is displayed in the overhead view mode. The display screen 60 includes a captured overhead view image 61, a button image 63, a presence icon 65, a speech balloon image 67, and a map image 69.

The captured overhead view image 61 is, for example, a captured image generated by the camera 11 through imaging at an X-fold zoom ratio, where X=1 as an example. In other words, the captured overhead view image 61 is a captured image generated by the camera 11 through imaging with no zoom.

For example, when a user specifies the position of the captured overhead view image 61, the real space information providing unit 181 switches the display mode from the overhead view mode to the proximity mode. More specifically, for example, when a user touches the position of the captured overhead view image 61 and the touch position corresponding to the captured overhead view image 61 is detected, the real space information providing unit 181 switches the display mode from the overhead view mode to the proximity mode.

The button image 63 is used for selecting another camera 11. For example, when a user specifies the position of the button image 63, the real space information providing unit 181 acquires a captured overhead view image generated by another camera 11 and then causes the display unit 150 to display the captured overhead view image. More specifically, for example, when a user touches the position of the button image 63 and the touch position corresponding to the button image 63 is detected, the real space information providing unit 181 acquires a captured overhead view image generated by another camera 11 and then causes the display unit 150 to display the captured overhead view image. For example, when a user specifies the position of a button image 63A, the camera 11 positioned on the left side of the current camera 11 is selected. Meanwhile, when a user specifies the position of a button image 63B, the camera 11 positioned on the right side of the current camera 11 is selected. The real space information providing unit 181 then acquires a captured overhead view image generated by the selected camera 11, and causes the display unit 150 to display the captured overhead view image.

The presence icon 65 indicates the busyness degree of a person shown in the captured overhead view image 61. For example, the color of the presence icon 65 changes in accordance with the busyness degree of a person. As an example, the presence icon 65 indicates a high busyness degree in red, a medium busyness degree in yellow, and a low busyness degree in blue. As discussed below, it is known in which part of the captured overhead view image 61 the person is supposed to be shown, and it is thus possible to display such an icon.

For example, in this way, the display screen 60 includes, for example, information (which will be referred to as "person related information") related to a person shown in the captured overhead view image 61. The person related information includes, for example, state information indicating the state of the person. As discussed above, the state information is the presence icon 65 as an example. Additionally, the person related information may include a state history indicating the states of the person at two or more time points. As an example, the state history information may include the history of the busyness degrees of a person shown in the captured overhead view image 61. In other words, the display screen 60 may display the history of the busyness degrees of a person. The real space information providing unit 181 acquires, for example, person related information or information necessary to display the person related information from the information management server 200 via the communication unit 110.

This person related information allows a user to more accurately grasp the situation of the person. In addition, the state information allows a user to more accurately determine whether or not the user can contact the person. The state history allows a user to grasp not only the momentary state of the person, but also the state of the person over a period of time, and the user can thus further more accurately determine whether or not the user can contact the person.

The speech balloon image 67 includes letter information presented by a person shown in the captured overhead view image 61. The speech balloon image 67 is also an example of the person related information.

The map image 69 indicates a map of the center office 10. The map image 69 further indicates the camera 11 in use with an icon. Especially when the center office 10 has a single camera 11 or a few cameras 11 alone installed therein, the map image 69 may be omitted.

Display Screen Displayed in Proximity Mode

Figure 5:
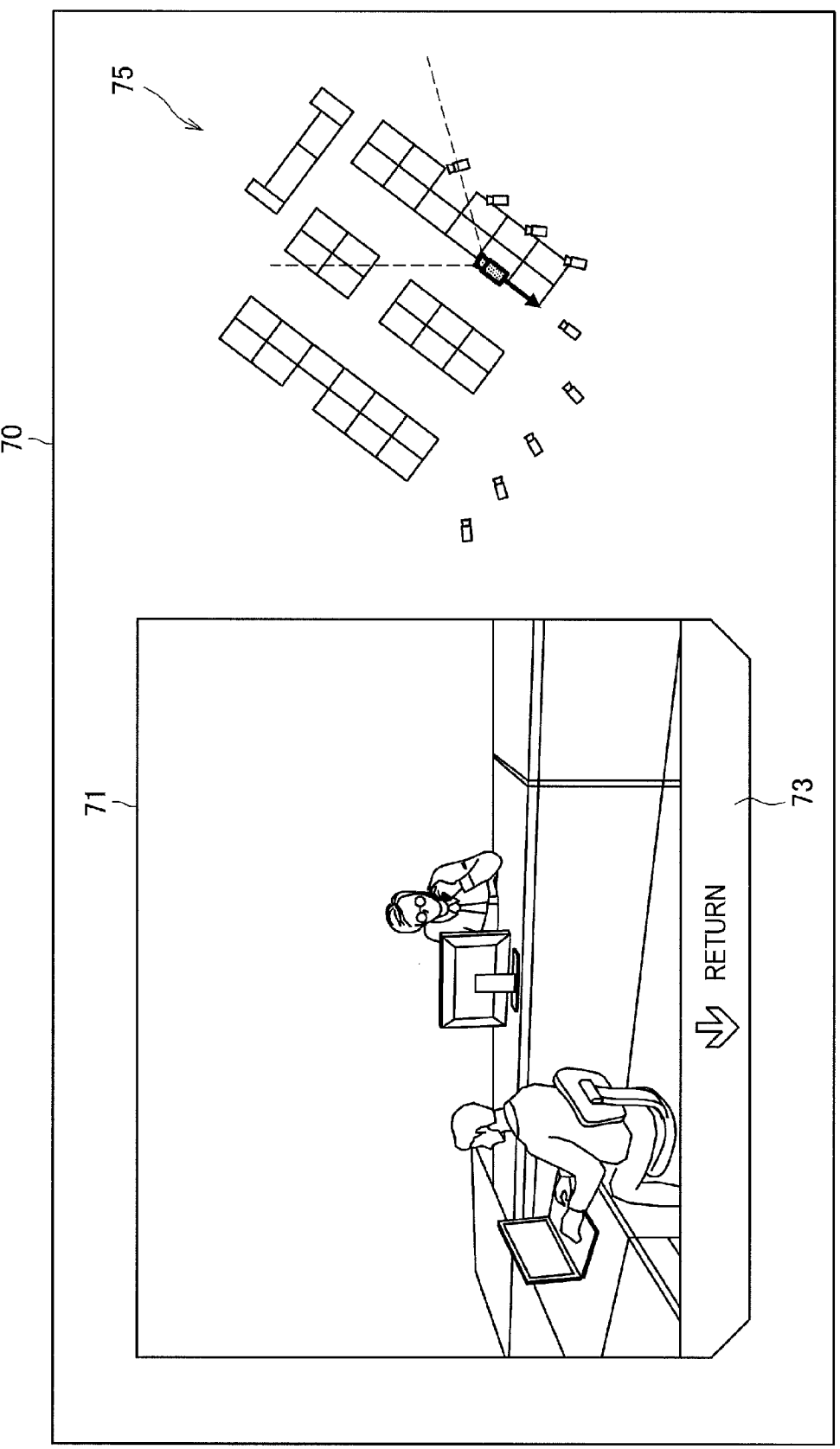
FIG. 5 is an explanatory diagram for describing an example of a display screen displayed in a proximity mode.

FIG. 5 is an explanatory diagram for describing an example of a display screen displayed in the proximity mode. FIG. 5 illustrates a display screen 70 that is displayed in the proximity mode. The display screen 70 includes a captured proximity image 71, a button image 73, and a map image 75.

The captured proximity image 71 is, for example, a captured image generated by the camera 11 through imaging at a Y-fold zoom ratio (Y>X), where Y=1.5 as an example. In other words, the captured proximity image 71 is a captured image generated by the camera 11 through imaging at a 1.5-fold zoom ratio.

The button image 73 is used for switching the display mode from the proximity mode to the overhead view mode. For example, when a user specifies the position of the button image 73, the real space information providing unit 181 switches the display mode from the proximity mode to the overhead view mode. More specifically, for example, when a user touches the position of the captured button image 73 and the touch position corresponding to the button image 73 is detected, the real space information providing unit 181 switches the display mode from the proximity mode to the overhead view mode.

The map image 75 indicates a map of the center office 10 in the same way as the map image 69 in the overhead view mode. The map image 75 further indicates the camera 11 in use. For example, the icon of a camera in use in the map image 75 is displayed at a more advanced position in the proximity mode to symbolically indicate zoom-in. Similarly to the map image 69 in the overhead view mode, especially when the center office 10 has a single camera 11 or a few cameras 11 alone installed therein, the map image 75 may be omitted.

The display screen 70 displayed in the proximity mode may also include person related information such as a presence icon and a speech balloon image.

As described above, a captured image obtained by imaging a wider area is displayed in accordance with the display mode, thereby allowing a user to watch the overall situation of a real space and to find out a specific person with ease. A captured image obtained by imaging a narrower area is displayed, thereby allowing a user to specify the position of a specific person more easily. All a user has to do is to switch the display mode, so that nothing but an easy operation is requested from the user. The zoom ratio of a captured image obtained by imaging a wider area is different from the zoom ratio of a captured image obtained by imaging a narrower area, and a user can thus intuitively grasp the relationship between these captured images with ease. Accordingly, even if the display mode is switched, the user can find out a specific person and specify the position of the specific person with ease.

Other Real Space Information

As described above, the real space information providing unit 181 causes the display unit 150 to display a display screen of a captured image showing a real space, thereby providing visual information on the real space. The real space information providing unit 181 may further provide auditory information on the real space. In other words, the real space information providing unit 181 may cause the audio output unit 160 to output audio of audio data obtained by collecting sounds in the real space.

For example, the real space information providing unit 181 selects the microphone 13 near the selected camera 11. The real space information providing unit 181 then acquires, from the microphone 13 via the communication unit 110, audio data obtained by collecting sounds in the center office 10. The real space information providing unit 181 may cause the audio output unit 160 to output audio of the acquired audio data.

(Position Acquisition Unit 183)

The position acquisition unit 183 acquires a position specified by a user in a captured image showing a real space on a display screen of the captured image. More specifically, for example, when the input unit 120 detects a position specified by a user in a captured image showing a real space on a display screen of the captured image, the position acquisition unit 183 acquires the position. The position acquisition unit 183 then provides the position in the captured image to the object selection unit 185.

As an example, if the position acquisition unit 183 acquires a position in the captured proximity image 71, the position acquisition unit 183 provides the position to the object selection unit 185. The following describes a specific example on this point with reference to FIGS. 6 and 7.

Figure 6:
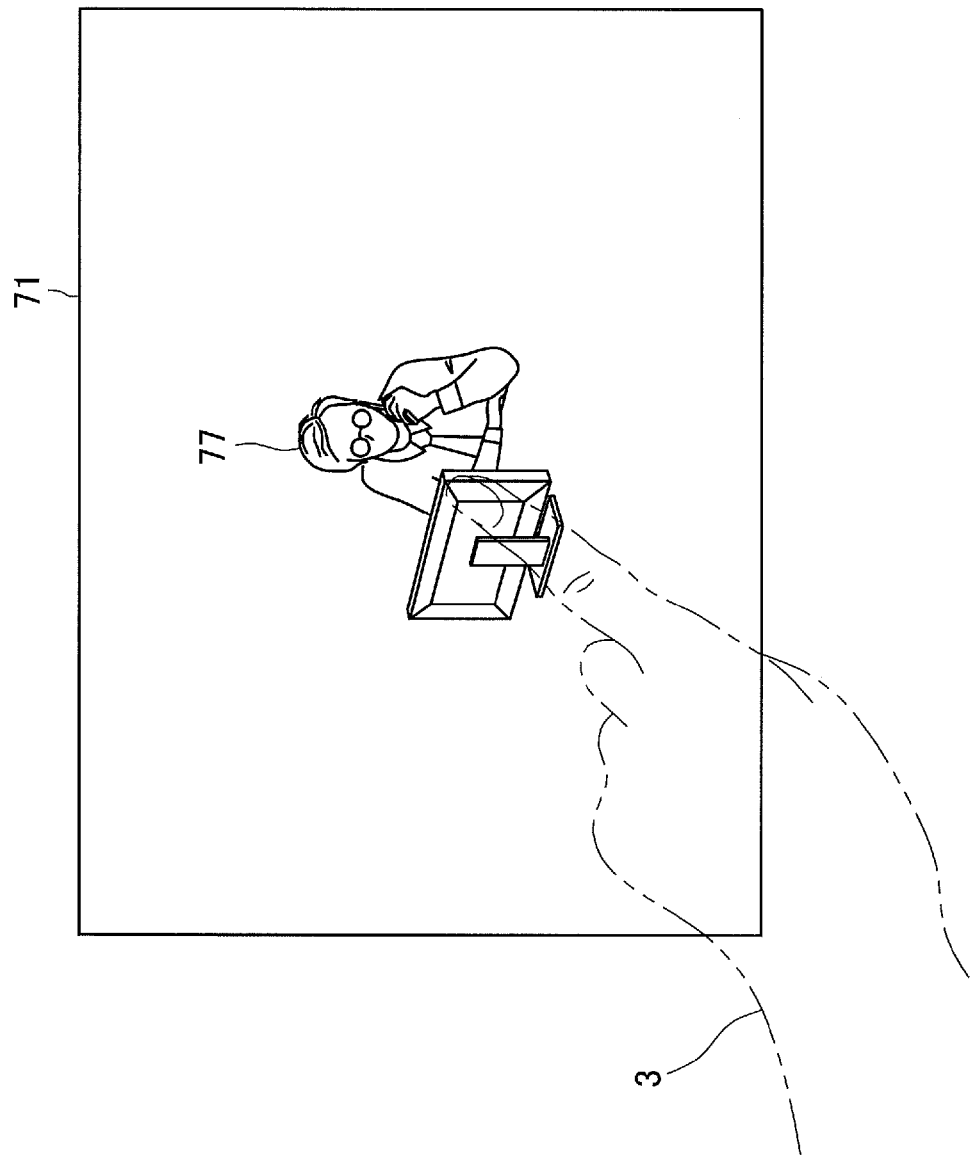
FIG. 6 is an explanatory diagram for describing a first example of a position specified by a user in a captured proximity image.

FIG. 6 is an explanatory diagram for describing a first example of a position specified by a user in a captured proximity image. FIG. 6 illustrates the captured proximity image 71 included in a display screen displayed in the proximity mode, and a hand 3 of a user. FIG. 6 also illustrates a person 77 shown in the captured proximity image 71. The user touches the position of the person 77 with the hand 3, thereby specifying the position of the person 77 in the captured proximity image 71. In this case, the input unit 120 detects the position of the person 77 in the captured proximity image 71, and the position acquisition unit 183 acquires the position. The input unit 120 then provides the acquired position to the object selection unit 185.

Figure 7:
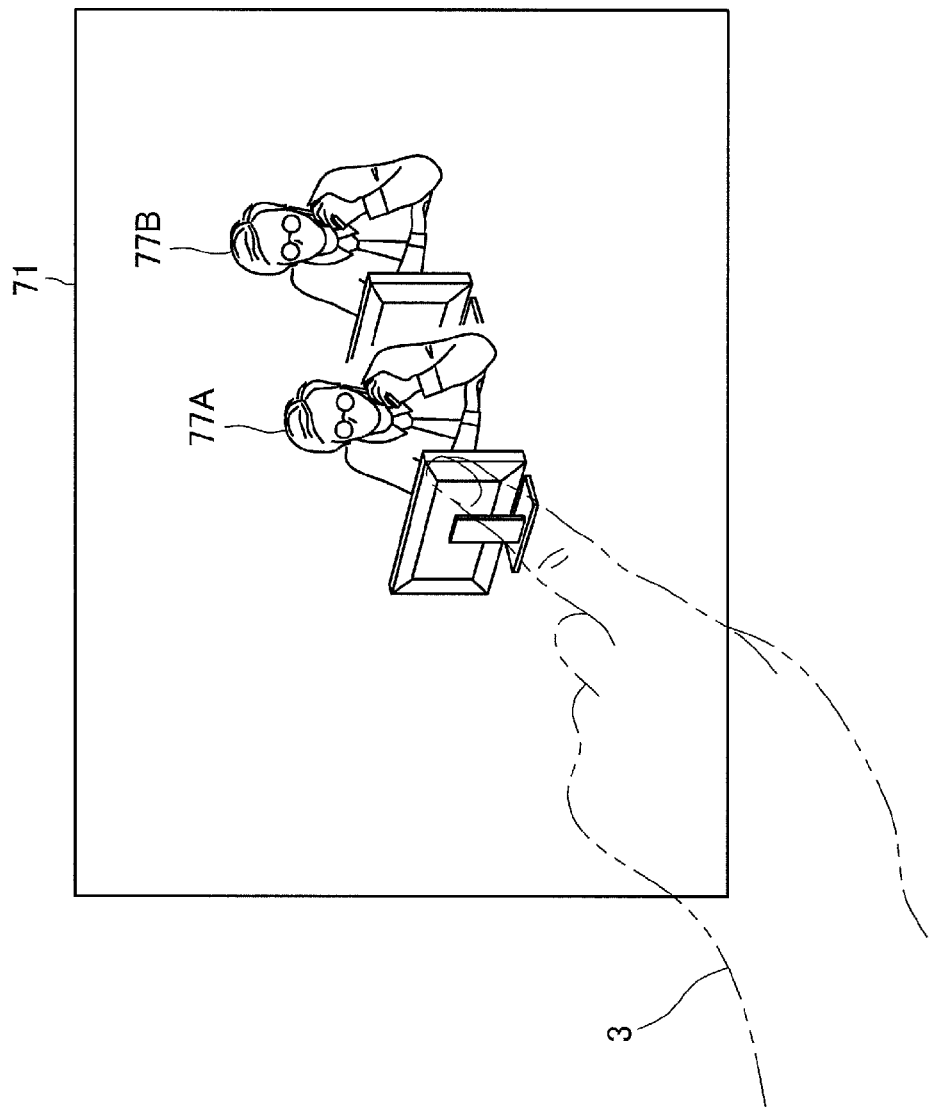
FIG. 7 is an explanatory diagram for describing a second example of a position specified by a user in a captured proximity image.

FIG. 7 is an explanatory diagram for describing a second example of a position specified by a user in a captured proximity image. FIG. 7 illustrates a person 77A and a person 77B each of which is shown in the captured proximity image 71. The user touches the position of the person 77A with the hand 3, thereby specifying the position of the person 77A in the captured proximity image 71. In this case, the input unit 120 detects the position of the person 77A in the captured proximity image 71, and the position acquisition unit 183 acquires the position. The input unit 120 then provides the acquired position to the object selection unit 185.

(Object Selection Unit 185)

The object selection unit 185 selects an object disposed in the three-dimensional virtual space corresponding to a real space on the basis of a position in a captured image to be acquired. For example, when the position acquisition unit 183 acquires a position specified by a user in a captured image showing a real space on a display screen of the captured image, the object selection unit 185 selects an object disposed in the three-dimensional virtual space corresponding to the real space on the basis of the position.

The object is disposed at the three-dimensional virtual position in the three-dimensional virtual space corresponding to the position in the captured image. For example, the captured image is included in a display screen in the second mode (e.g. proximity mode).

As an example, when the position acquisition unit 183 acquires a position in a captured proximity image generated by the camera 11, the object selection unit 185 selects an object corresponding to the position from objects disposed in the three-dimensional virtual space corresponding to the center office 10. Additionally, the object selection unit 185 acquires, for example, data of the three-dimensional virtual space corresponding to the center office 10 from the storage unit 170.

Example in which Single Object is Disposed

Figure 8:
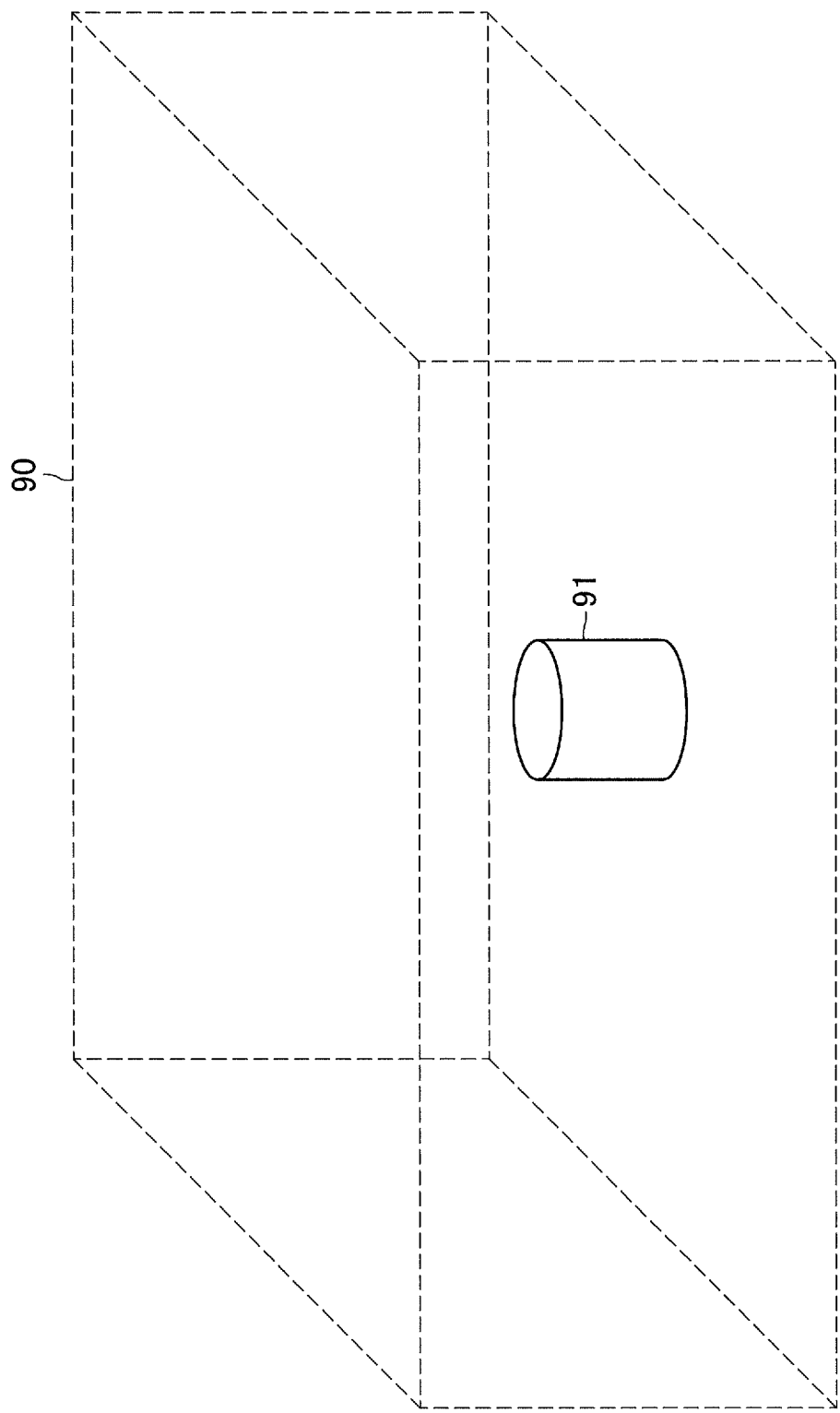
FIG. 8 is an explanatory diagram for describing a first example of a three-dimensional virtual space corresponding to a center office.
Figure 9:
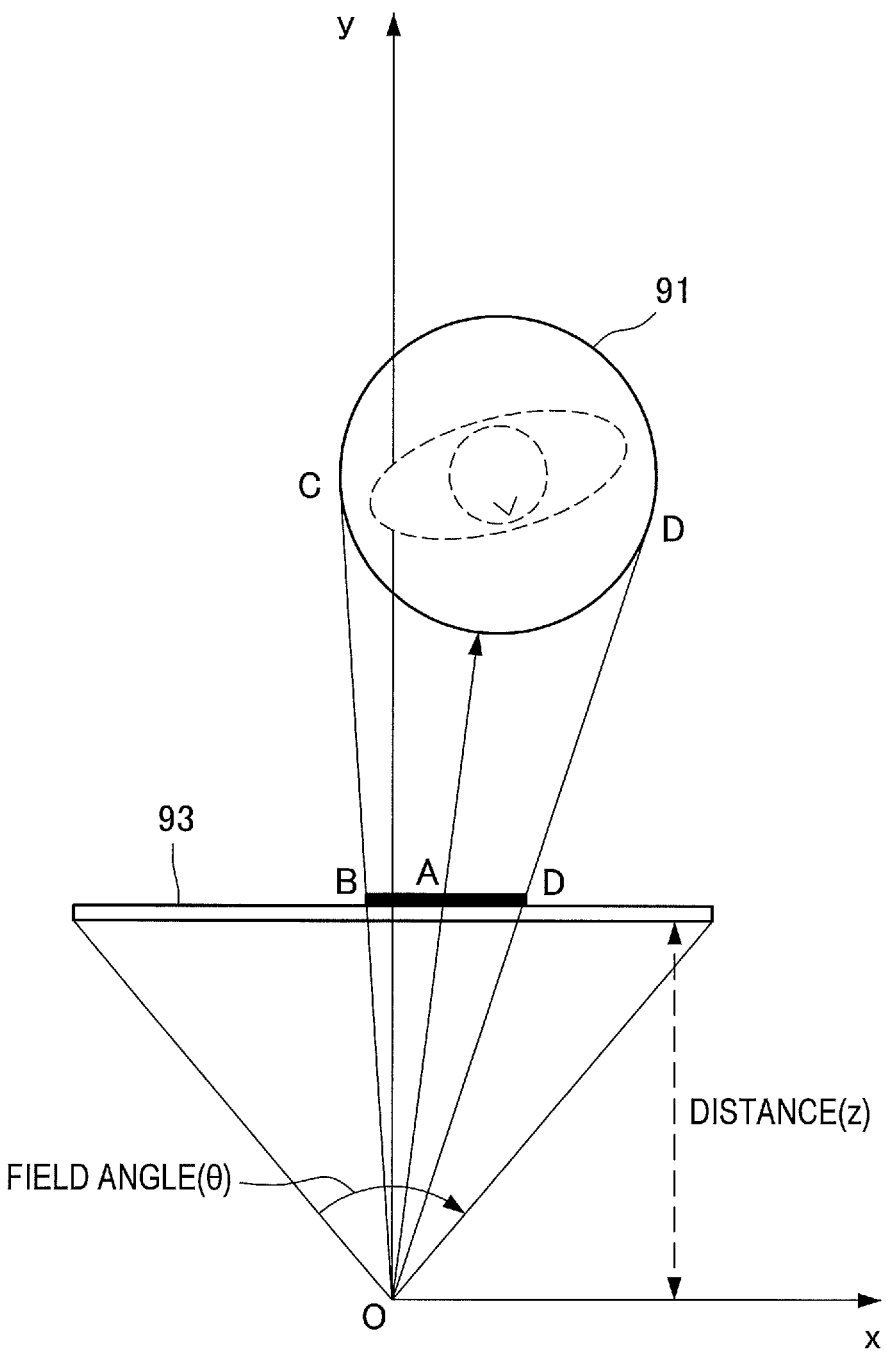
FIG. 9 is an explanatory diagram for describing an example in which an object disposed in the three-dimensional virtual space illustrated in FIG. 8 is selected.

The following describes a specific example in which a single object is disposed in a three-dimensional virtual space with reference to FIGS. 8 and 9.

FIG. 8 is an explanatory diagram for describing a first example of a three-dimensional virtual space corresponding to the center office 10. FIG. 8 illustrates a three-dimensional virtual space 90 corresponding to the center office 10. There is an object 91 disposed in the three-dimensional virtual space 90. The object 91 corresponds to a person (e.g. Mr. A). The object is disposed at the three-dimensional virtual position corresponding to the position of the seat of the person (e.g. Mr. A) in the center office 10. In other words, when the person is sitting on the seat, the object 91 is disposed at the three-dimensional virtual position at which the person is supposed to be. The object 91 is a cylindrical object in this example. The cylindrical object has a radius R and a height H. The radius R and the height H are, for example, defined in advance. Additionally, data of the three-dimensional virtual space 90 also include information related to each camera 11. For example, the information related to each camera 11 includes the three-dimensional virtual position corresponding to the installation position of each camera 11, the imaging direction (e.g. direction vertical to the lens of the camera), and the field angle.

FIG. 9 is an explanatory diagram for describing an example in which an object disposed in the three-dimensional virtual space illustrated in FIG. 8 is selected. FIG. 9 illustrates a positional relationship on the horizontal plane in the three-dimensional virtual space 90 for ease of understanding. Specifically, FIG. 9 illustrates the object 91 disposed in the three-dimensional virtual space 90, a three-dimensional virtual position (which will be referred to as "virtual camera position") O corresponding to the installation position of the camera 11 used for capturing an image, an axis y corresponding to the imaging direction (e.g. direction vertical to the lens of the camera) of the camera 11, and an axis x orthogonal to the axis y. It is assumed in this example for ease of understanding that the camera 11 is installed to have the imaging direction parallel to the horizontal plane.

FIG. 9 further illustrates a field angle θ of the camera 11. FIG. 9 also illustrates a virtual plane 93 that is vertical to the axis y corresponding to the imaging direction of the camera 11 and has a width corresponding to the field angle θ. The virtual plane 93 is spaced apart from the virtual camera position O by a distance z. The virtual plane 93 is a quadrangular plane, and has the same aspect ratio as the aspect ratio of a captured image. In other words, the virtual plane 93 corresponds to the captured image.

The object selection unit 185 converts a position specified by a user in the captured image, for example, as illustrated in FIG. 6, into a three-dimensional virtual position A. The object selection unit 185 then identifies an object intersecting the line connecting the virtual camera position O and the three-dimensional virtual position A. The object selection unit 185 identifies the object 91 in this example. The object selection unit 185 then selects the object 91.

For example, when a user specifies, on a captured image, a position in the captured image which is converted into a three-dimensional virtual position between a three-dimensional virtual position B and a three-dimensional virtual position D on the virtual plane 93, the object 91 is selected in the example of FIG. 9. Additionally, the person corresponding to the object 91 is shown at such a position in a captured image, in general.

Additionally, the distance z is decided in a manner that the virtual plane 93 is positioned between the virtual camera position O and the object 91. As an example, the distance z is the focal distance of the camera 11, but needless to say, the distance z is not limited thereto.

The technique has been described for ease of understanding that selects an object on the basis of the horizontal plane of the three-dimensional virtual space 90, but needless to say, even if the vertical direction (e.g. z axis) is used, it is still possible to convert a position in a captured image into a three-dimensional virtual position and to identify the object 91 on the basis of the three-dimensional virtual position.

For example, the object corresponding to a position in a captured image is selected as described above. Although a position in a captured image is converted into a three-dimensional virtual position to identify the object corresponding to the position in the captured image in the above-described example, any other techniques can be used to identify the object corresponding to a position in a captured image.

As an example, the object selection unit 185 may use the virtual camera position O as the original for projecting the object 91 onto the virtual plane 93, and convert the projection range of the object 91 into the range within the captured image. When the range includes the position specified by a user in the captured image, the object selection unit 185 may select the object 91.

As an another example, the object selection unit 185 may render the three-dimensional virtual space 90 by using the virtual camera position O, the axis y, and the field angle θ to generate a rendering image, and obtain the range within the captured image which corresponds to the object 91 from the range in the rendering image within which the object 91 is shown. When the range includes the position specified by a user in the captured image, the object selection unit 185 may select the object 91.

Selection of Object Based on State

For example, the object 91 disposed in the three-dimensional virtual space 90 corresponds to state information indicating any of a plurality of states. For example, the object 91 corresponds to a person. The object 91 corresponds to state information (which will be referred to as "presence/absence information") indicating whether or not the person is sitting on the seat. The presence/absence information indicates a state in which a person is sitting on the seat or a state in which a person is not sitting on the seat. For example, the object selection unit 185 acquires a determination result indicating whether or not the person corresponding to the object 91 is sitting on the seat from the sensor 15 via the communication unit 110. The determination result then serves as the presence/absence information.

For example, the object selection unit 185 selects the object that is disposed in the three-dimensional virtual space and corresponds to the state information indicating a predetermined state of the plurality of states. For example, the object selection unit 185 selects an object that is disposed in the three-dimensional virtual space and corresponds to state information indicating the state in which the person is sitting on the seat. In other words, when the sensor 15 determines that the person is sitting on the seat, the object selection unit 185 can select the object corresponding to the person, but when the sensor 15 determines that the person is not sitting on the seat, the object selection unit 185 does not select the object corresponding to the person.

In this way, the selection of an object depends on the state of a person, and it is thus possible to avoid the selection of an object that is not actually to be selected. For example, it is possible to avoid the selection of an object that corresponds to a person who is not present.

Example in which Two Objects are Disposed

In addition, there may be two or more objects disposed in a three-dimensional virtual space. The following describes a specific example in which two objects are disposed with reference to FIG. 10.

Figure 10:
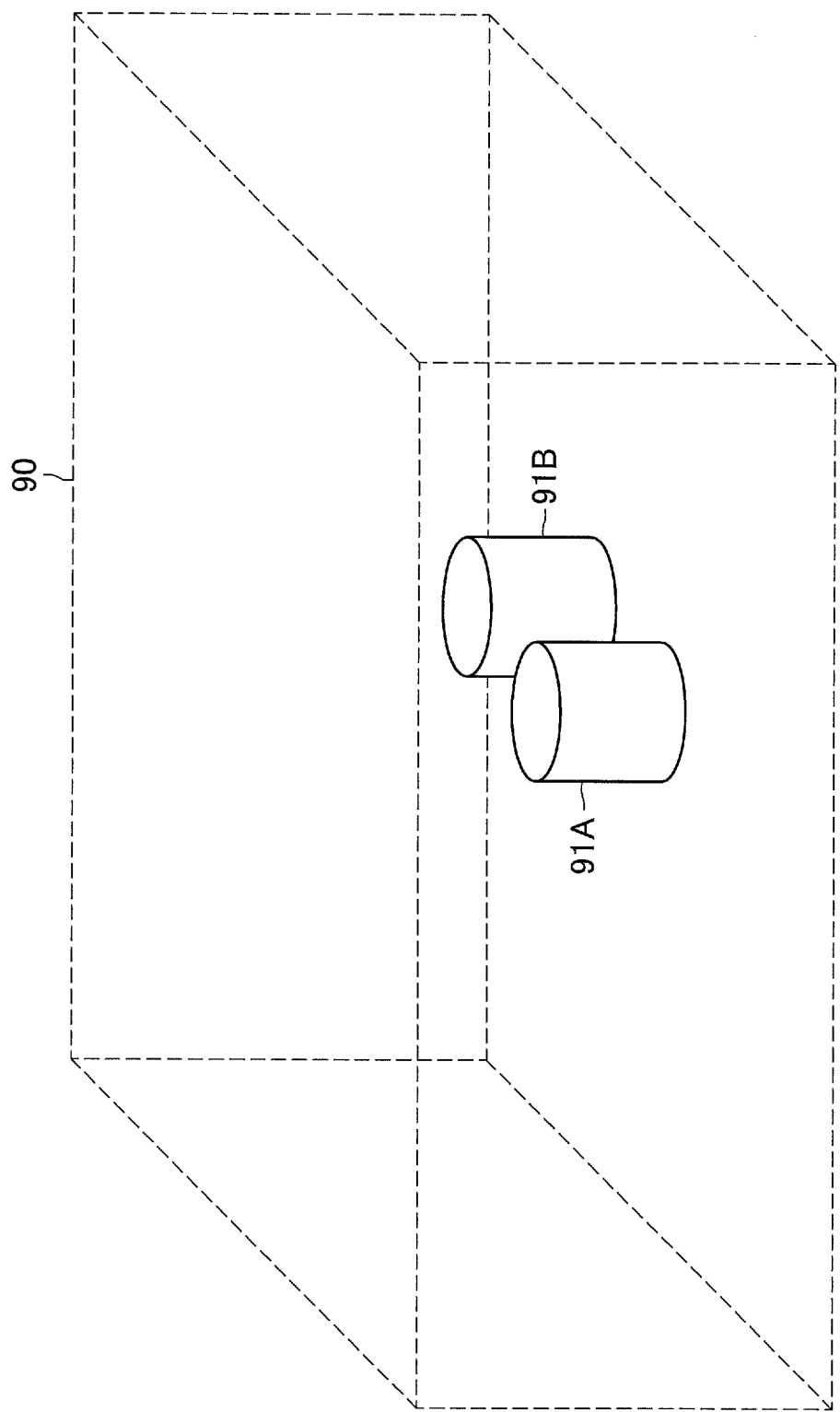
FIG. 10 is an explanatory diagram for describing a second example of a three-dimensional virtual space corresponding to a center office.

FIG. 10 is an explanatory diagram for describing a second example of the three-dimensional virtual space corresponding to the center office 10. FIG. 10 illustrates the three-dimensional virtual space 90 corresponding to the center office 10. There are objects 91A and 91B disposed in the three-dimensional virtual space 90. The object 91A corresponds to a certain person (e.g. Mr. A), and is disposed at the three-dimensional virtual position corresponding to the position of the certain person's seat in the center office 10. The object 91B corresponds to a certain person (e.g. Mr. B), and is disposed at the three-dimensional virtual position corresponding to the position of the certain person's seat in the center office 10. Similarly to the example of FIG. 8, the object 91 is a cylindrical object having the radius R and the height H.

When there are two or more objects disposed in a three-dimensional virtual space in this way, the plurality of objects may correspond to positions specified by a user in a captured image For example, both the objects 91A and 91B may correspond to positions specified by a user in a captured image in the example of FIG. 10. As an example, when there may be two persons shown in a captured image as illustrated in FIG. 7, a user specifies the position in the captured image at which the two persons overlap with each other, and the two objects corresponding to the two persons may then correspond to the positions.

Accordingly, in this case (i.e. a plurality of objects correspond to positions specified by a user in a captured image), the object selection unit 185 selects any one of the plurality of objects. In other words, when there are a plurality of objects disposed at the respective three-dimensional virtual positions in the three-dimensional virtual space corresponding to positions specified by a user in a captured image, the object selection unit 185 selects any one of the plurality of objects.

For example, the captured image is generated through an imaging device present in the real space. The object selection unit 185 then selects an object nearer to the three-dimensional virtual position in the three-dimensional virtual space corresponding to the imaging device from the plurality of objects. More specifically, for example, the captured image is generated through the camera 11 in the center office 10. When there are a plurality of objects corresponding to positions specified by a user in a captured image, the object selection unit 185 then selects an object nearer to the three-dimensional virtual position (i.e. virtual camera position O) corresponding to the installation position of the camera 11. The following describes a specific example on this point with reference to FIGS. 10 and 11.

Figure 11:
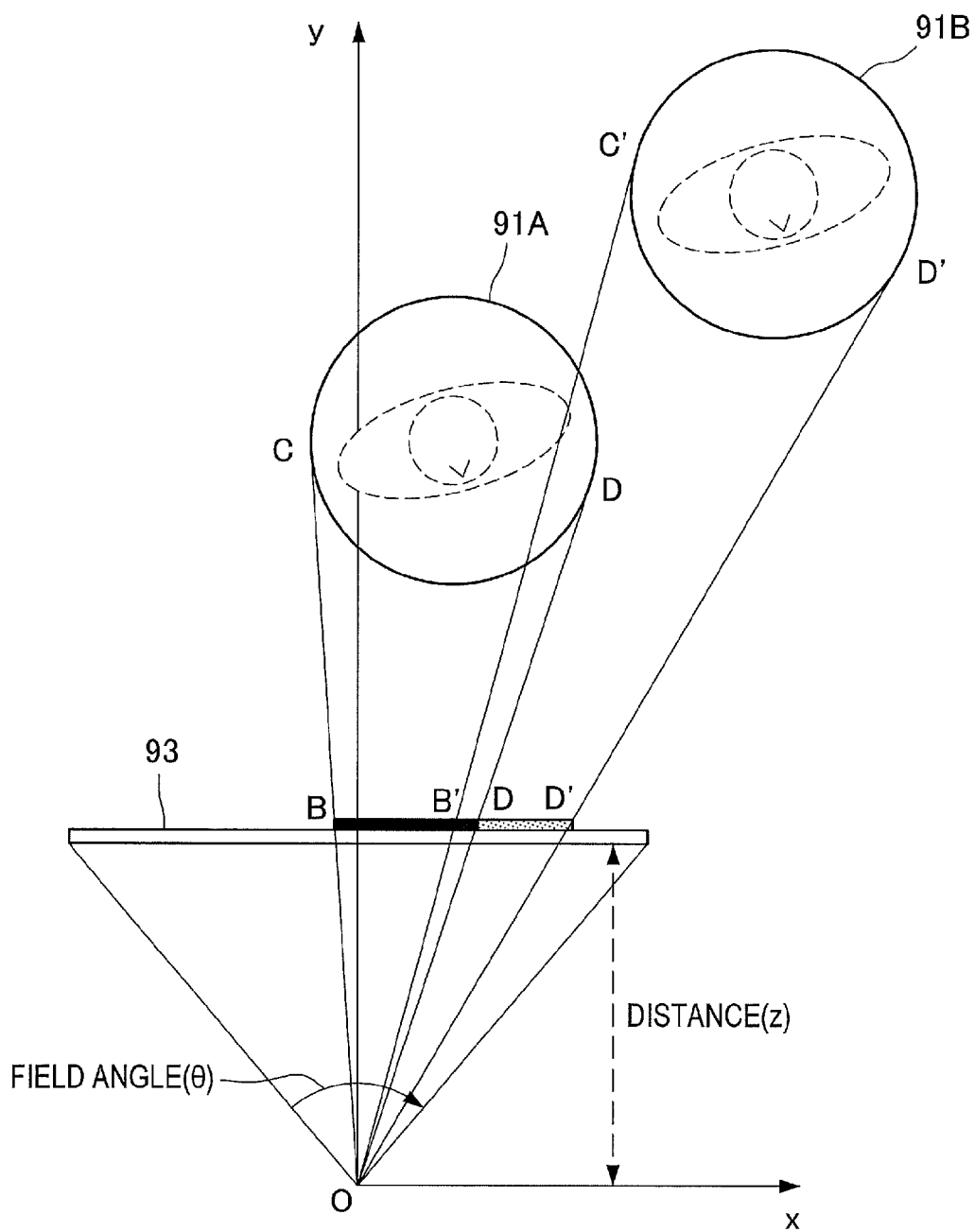
FIG. 11 is an explanatory diagram for describing an example in which an object disposed in the three-dimensional virtual space illustrated in FIG. 10 is selected.

FIG. 11 is an explanatory diagram for describing an example in which an object disposed in the three-dimensional virtual space illustrated in FIG. 10 is selected. FIG. 11 illustrates a positional relationship on the horizontal plane in the three-dimensional virtual space 90 for ease of understanding. Specifically, FIG. 11 illustrates the objects 91A and 91B disposed in the three-dimensional virtual space 90. Similarly to FIG. 9, FIG. 11 illustrates the virtual camera position O, the axis y, the axis x, the field angle θ, and the virtual plane 93. It is also assumed in this example for ease of understanding, similarly to FIG. 9, that the camera 11 is installed to have the imaging direction parallel to the horizontal plane.

For example, positions in the captured image are specified by a user as illustrated in FIG. 7. In this case, if the specified positions in the captured image are converted into three-dimensional virtual positions between a three-dimensional virtual position B' and the three-dimensional virtual position D, both the objects 91A and 91B are identified as the objects corresponding to the positions in the captured image in accordance with the technique described with reference to FIG. 9. The object selection unit 185 then selects, from the objects 91A and 91B, the object 91A nearer to the virtual camera position O.

Additionally, if positions specified by a user are converted into the three-dimensional virtual positions between the three-dimensional virtual position B and the three-dimensional virtual position B', the object 91A is identified and selected as the object corresponding to the position in the captured image. Additionally, if positions specified by a user are converted into the three-dimensional virtual positions between the three-dimensional virtual position D and the three-dimensional virtual position D', the object 91B is identified and selected as the object corresponding to the position in the captured image.

If a single object is selected from a plurality of objects in this way, a plurality of objects are not selected, and then it is possible to avoid an error (error caused by the acquisition of a plurality of communication IDs) in the following processing. The selection of the object near the virtual camera position corresponding to the camera 11 from a plurality of objects leads to the selection of the object corresponding to a person shown in the foreground even if, for example, people are overlapping with each other in the captured image. The object corresponding to the person intended by the user is then selected.

As described above, the object selection unit 185 selects an object. The object selection unit 185 then provides identification information (which will be referred to as "object ID") on the selected object to the ID acquisition unit 187. The object ID may be identification information on the person corresponding to the selected object, or merely a number attached to the selected object.

(ID Acquisition Unit 187)

The ID acquisition unit 187 acquires identification information corresponding to the selected object. For example, the identification information is communication identification information (which will be referred to as "communication ID") corresponding to the selected object. The communication ID is a telephone number as an example.

Specifically, for example, when the object selection unit 185 selects an object, the ID acquisition unit 187 acquires the object ID of the selected object. The object selection unit 185 then transmits the object ID to the information management server 200 via the communication unit 110, and acquires the communication ID corresponding to the object ID. The communication ID is the communication ID of the person corresponding to the selected object.

For example, as described above, the ID acquisition unit 187 acquires the communication ID corresponding to the selected object. The communication ID is the communication ID of a communication device of the person (i.e. person shown at a position specified by a user in a captured image) corresponding to the object. The ID acquisition unit 187 then provides the acquired communication ID to the telephone unit 189.

As described above, when a user specifies a position in a captured image, the object corresponding to the position is selected and the communication ID corresponding to the object is acquired. This allows the user to contact the target person with an intuitive operation. Since the object corresponding to a person is selected and the communication ID is acquired irrespective of the way the person is shown in a captured image, the user can more surely contact the person.
(Telephone Unit 189)

The telephone unit 189 provides a function for making a telephone call. For example, the telephone unit 189 provides the function of a softphone.

For example, when the telephone unit 189 acquires a communication ID provided by the ID acquisition unit 187, the telephone unit 189 uses the communication ID to make a telephone call. More specifically, for example, when the telephone unit 189 acquires a communication ID, the telephone unit 189 provides the communication ID to the PBX 40 via the communication unit 110 and acquires the IP address from the PBX 40. The telephone unit 189 then executes a series of sequences for establishing a session with the communication device (i.e. communication device serving as a telephone call receiver) having the IP address.

The telephone unit 189 makes a telephone call to call the person shown at a position specified by a user in a captured image on a display screen in this way. In other words, the telephone unit 189 makes a telephone call to the communication device of the person.

When the communication unit 110 receives audio data from the communication device of the person on the other side of the telephone, the telephone unit 189 causes the audio output unit 160 to output the audio of the audio data. In addition, the telephone unit 189 causes the communication unit 110 to transmit audio data provided by the sound collection unit 140 to the communication device of the person on the other side of the telephone. The telephone unit 189, for example, causes the communication unit 110 to transmit a captured image (such as a captured image showing a user of the terminal device 100) provided by the imaging unit 130 to the communication device of the person on the other side of the telephone.

The telephone unit 189 causes the display unit 150 to display a display screen for a telephone call. For example, a display mode in which a display screen for a telephone call is displayed is referred to as conversation mode. In this case, when the telephone unit 189 acquires the communication ID provided by the ID acquisition unit 187, the telephone unit 189 switches the display mode from the proximity mode to the conversation mode. The following describes a specific example with reference to FIG. 12 about the display screen in the conversation mode.

Figure 12:
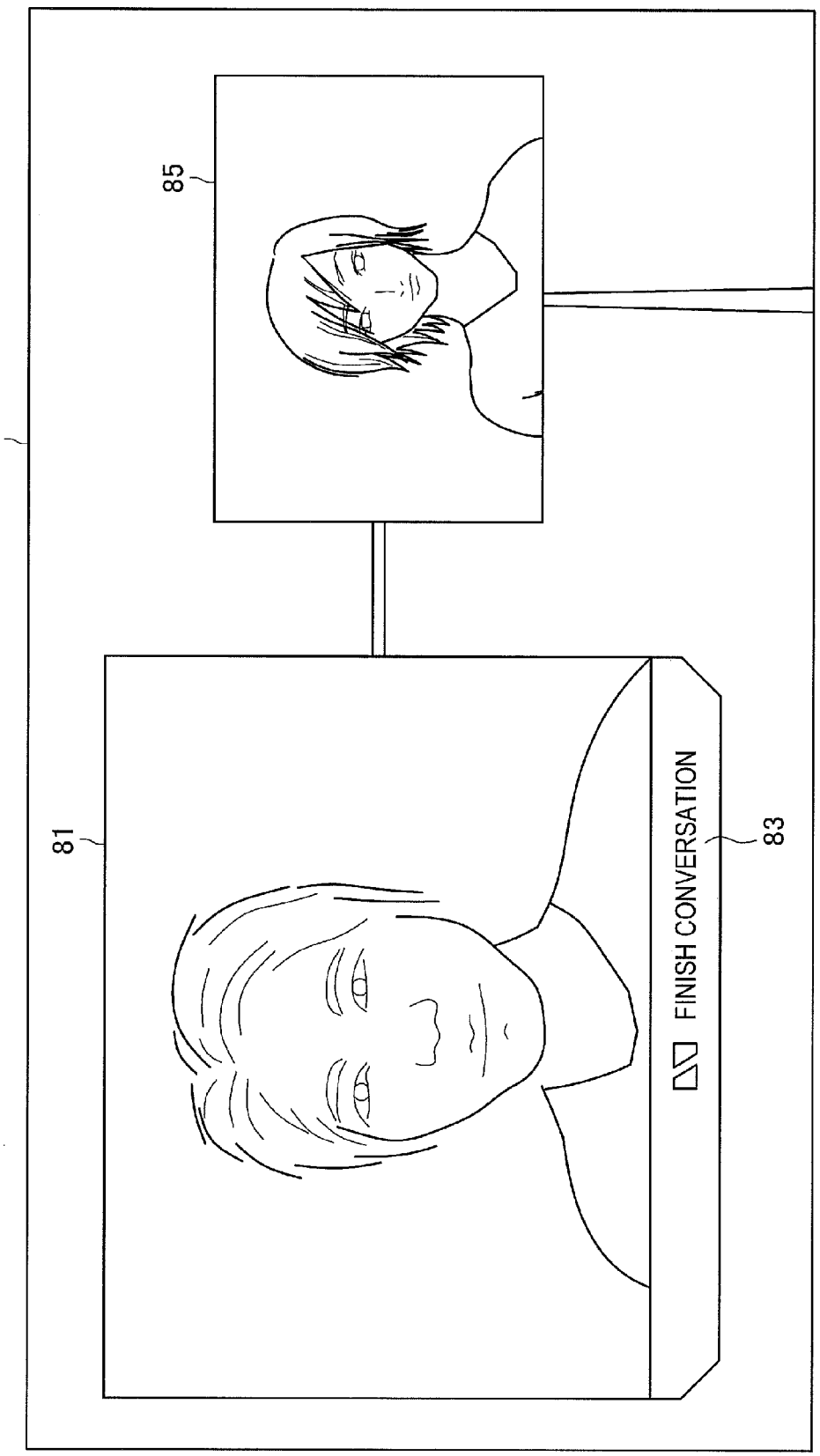
FIG. 12 is an explanatory diagram for describing an example of a display screen displayed in a conversation mode.

FIG. 12 is an explanatory diagram for describing an example of a display screen displayed in the conversation mode. FIG. 12 illustrates a display screen 80 that is displayed in the conversation mode. The display screen 80 includes a captured image 81 of the other side of the line, a button image 83, and a captured image 85 of the side of the terminal device 100.

The captured image 81 of the other side of the line is, for example, a captured image acquired from the communication device of the person on the other side of the telephone. For example, when the communication unit 110 receives a captured image from the communication device of the person on the other side of the telephone, the telephone unit 189 uses the captured image as the captured image 81 of the other side of the line.

Meanwhile, the button image 63 is an image for hanging up the telephone. For example, when a user specifies the position of the button image 83, the telephone unit 189 hangs up the telephone. More specifically, for example, when a user touches the position of the button image 83 and the touch position corresponding to the button image 83 is detected, the telephone unit 189 executes a sequence for hanging up the telephone, the sequence including the disconnection of the session. In addition, for example, the telephone unit 189 switches the display mode from the conversation mode to the overhead view mode.

The captured image 85 of the side of the terminal device 100 is a captured image provided by the imaging unit 130.
(Others: Transition of Display Mode)

Figure 13:
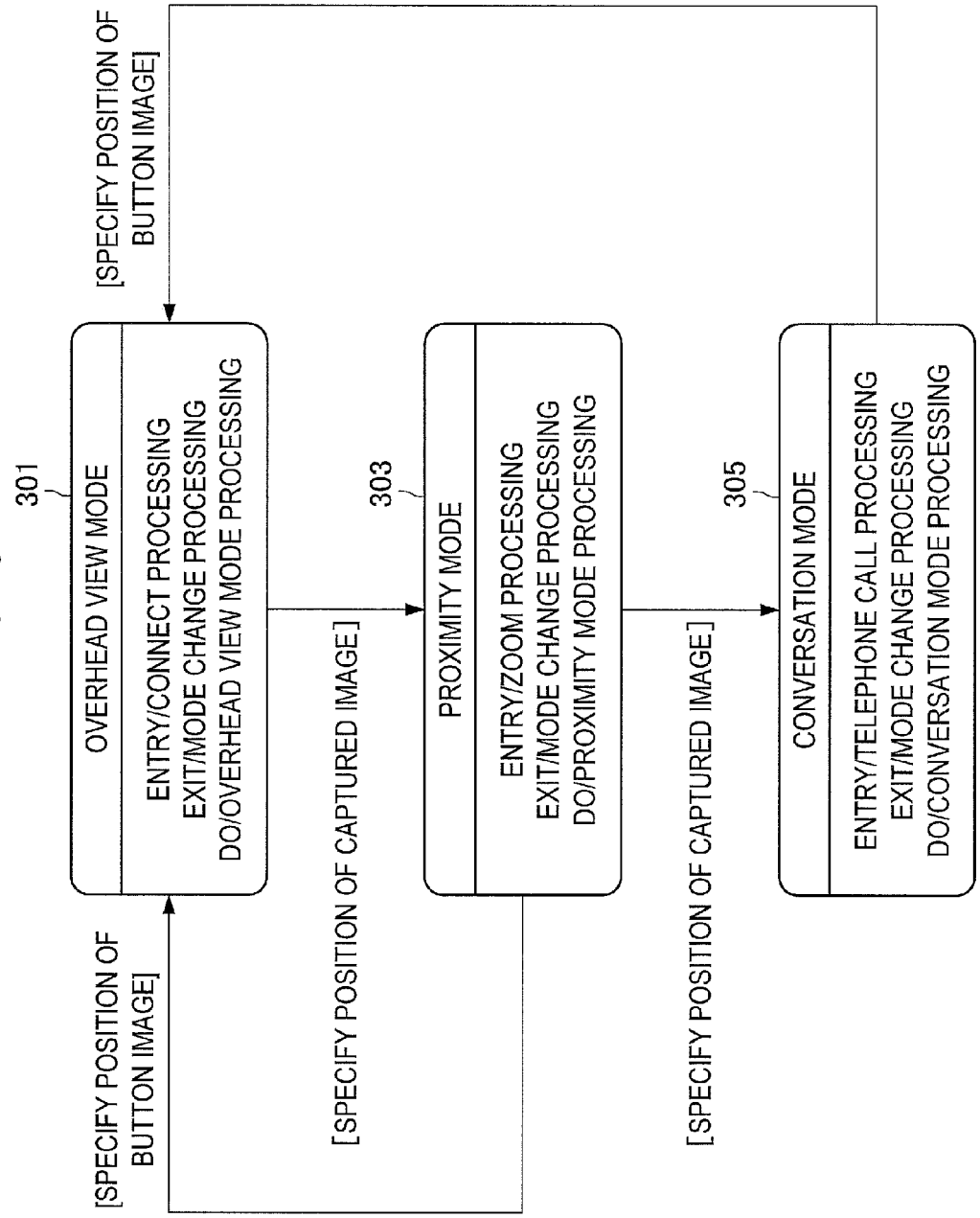
FIG. 13 is a transition diagram for describing an example in which a display mode transitions.

The following describes a specific example of the transition between the overhead view mode, the proximity mode, and the conversation mode with reference to FIG. 13.

FIG. 13 is a transition diagram for describing an example in which a display mode transitions. FIG. 13 illustrates that, for example, processing of connecting the camera 11, the microphone 13, the sensor 15, and the information management server 200 at the start of software causes the display mode to transition to an overhead view mode 301 (ENTRY).

Overhead view mode processing is executed in the overhead view mode 301 (DO). When a user specifies the position of the captured overhead view image 61, mode change processing is executed (EXIT) and the display mode switches from the overhead view mode 301 to a proximity mode 303. The mode change processing includes zoom processing of the camera 11 (ENTRY).

Proximity mode processing is executed in the proximity mode 303 (DO). When a user specifies the position of the captured proximity image 71 which shows a person, mode change processing is executed (EXIT) and the display mode switches from the proximity mode 303 to a conversation mode 305. The mode change processing in this case includes processing of a telephone call (ENTRY). When a user specifies the position of the button image 73, mode change processing is executed (EXIT) and the display mode switches from the proximity mode 303 to the overhead view mode 301. The mode change processing in this case includes the connection processing (ENTRY).

Conversation mode processing is executed in the conversation mode 305 (DO). When a user specifies the position of the button image 83, mode change processing is executed (EXIT) and the display mode switches from the conversation mode 305 to the overhead view mode 301. The mode change processing in this case includes the connection processing (ENTRY).
(Others: Another Example of Display Screen)
Captured Image according to Display Mode As discussed above, for example, the real space information providing unit 181 causes the display unit 150 to display a first captured image (such as a captured overhead view image) obtained by imaging a first area of a real space in the first display mode (such as the overhead view mode). Meanwhile, the real space information providing unit 181 causes the display unit 150 to display a second captured image (such as a captured proximity image) obtained by imaging a second area narrower than the first area in the second display mode (such as the proximity mode). In the above-described example, the first captured image obtained by imaging the first area of the real space, in particular, corresponds to a first zoom ratio, while the second captured image obtained by imaging the second area narrower than the first area corresponds to a second zoom ratio higher than the first zoom ratio. However, the first and second captured images are not limited thereto.

For example, the first captured image may be generated through a first imaging device of a plurality of imaging devices present in the real space, while the second captured image may be generated through a second imaging device of the plurality of imaging devices. In this case, for example, the real space information providing unit 181 selects a camera 11 that images a wide area of the center office 10 in the overhead view mode, and acquires a captured image generated by the camera 11 as a captured overhead view image. The real space information providing unit 181 selects a camera 11 (such as a camera positioned more forward) that images a narrower area of the center office 10 in the proximity mode, and acquires a captured image generated by the camera 11 as a captured proximity image.

Accordingly, some disposition of the camera 11 facilitates a user to more easily specify the position of a person. There is no need to request the camera 11 to zoom. Accordingly, there is no contention of requests from individual terminal devices that request, for example, optical zoom or zoom using a dolly, so that none of the terminal devices have to be waiting. There is also no increase in processing loads as digital zoom requests.

Captured Image Generated through Imaging Under More Free Condition

An example in which the display mode is switched has been described as the above-described example, but the display screen is not limited thereto. For example, a captured image may be generated through imaging under a more free condition, and a display screen including the captured image may be displayed instead of the switch of the display mode.

For example, a captured image of a real space may correspond to a zoom ratio selected from a plurality of zoom ratios. In this case, for example, the real space information providing unit 181 requests a zoom ratio specified by a user via the input unit 120 from the camera 11 via the communication unit 110. As a result, the camera 11 changes the zoom ratio in accordance with the request, and provides the terminal device 100 with a captured image generated through imaging at the changed zoom ratio. The real space information providing unit 181 causes the display unit 150 to display a display screen including the provided captured image. When a user specifies a position in the captured image, the position acquisition unit 183 acquires the position. The position acquisition unit 183 then provides the position in the captured image to the object selection unit 185.

This allows a user to specify a zoom ratio minutely, and then, a desired captured image can be displayed. The user can thus specify the position of a specific person more easily.

Additionally, as discussed above, the zoom ratio does not have to take a precise value such as a 1.5-fold magnification and a 2-fold magnification, but only has to directly or indirectly indicate the approximate size of a subject that can be included in the captured image. For example, especially when the position of the camera 11 is changed to zoom (e.g. to zoom in and out by using a dolly), the zoom ratio does not have to take a precise value such as a 1.5-fold magnification and a 2-fold magnification, but only has to directly indicate the approximate size of a subject (e.g. in the form of a parameter indicating the approximate size of the subject) or indirectly indicate the approximate size of the subject (e.g. in the form of the position of the camera 11 on the rail).

(Camera Line Control Unit 191)

The camera line control unit 191 performs operations of calculating various parameters related to a camera line discussed below and camera line display control, and acquires a user input into the camera line. The "camera line" here is a coined word in an embodiment of the present invention, and means a line indicating a display element and an input element of a user interface which are displayed on a display screen of the terminal device 100.

Figure 14:
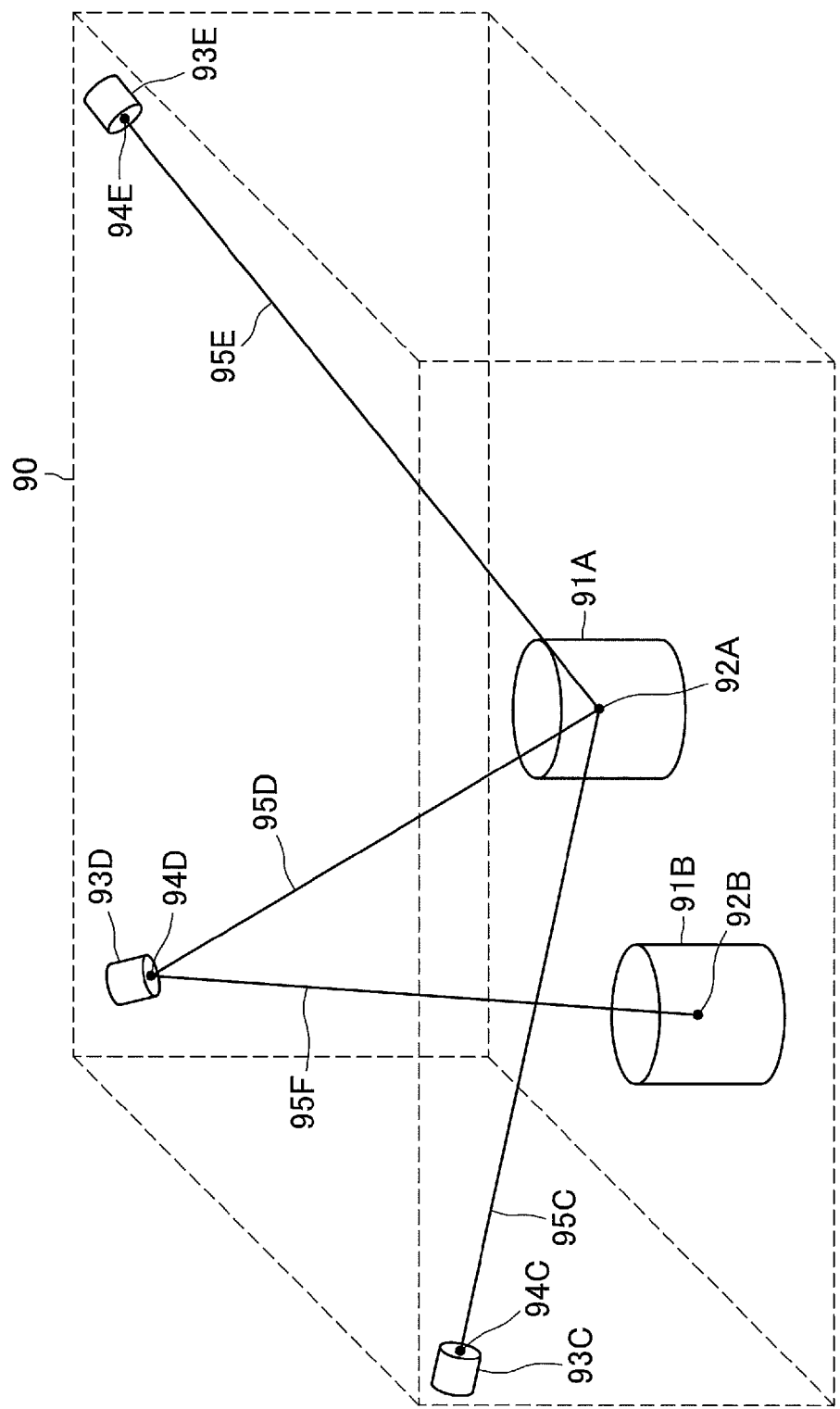
FIG. 14 is an explanatory diagram for describing an example of camera lines in the three-dimensional virtual space corresponding to the center office.

More specifically, as described above, the position acquisition unit 183 acquires a selection position based on specifications of a user, but the camera line may be a line (which will also be referred to as "three-dimensional line") according to the three-dimensional selection position corresponding to the selection position in the three-dimensional virtual space 90 corresponding to the center office 10 and the three-dimensional installation position of the camera 11 which includes the three-dimensional selection position within the imaging range (discussed below with reference to FIG. 14). The following description uses the position of the object which corresponds to a position specified by a user as an example of the selection position based on specifications of a user, but the position specified by a user may also serve as the selection position based on specifications of a user.

The present embodiment uses a straight line as an example of the "line," but a curved line can also be used as the "line." For example, a line according to a three-dimensional selection position and a three-dimensional installation position may be the whole of a line having the selection position and the installation position as the respective ends, or may be a part of a line having the selection position and the installation position as the respective ends. The "camera line" may also mean a line (two-dimensional line) obtained by projecting a three-dimensional line onto the corresponding position on a display screen of a captured image in the following description.

Additionally, as discussed above, data of the three-dimensional virtual space 90 also include information related to each camera 11. For example, the information related to each camera 11 includes the three-dimensional virtual position corresponding to the installation position of each camera 11, the imaging direction (e.g. direction vertical to the lens of the camera, which includes an optical axis), and the field angle (or the imaging range). The terminal device 100 can identify which camera 11 includes a three-dimensional selection position within the imaging range by using the information. The information is stored in the information management server 200, and when there occurs a situation in which the terminal device 100 requires the information, the information may be acquired via the communication unit 110 as necessary.

The camera line is projected and superimposed on a display screen of the terminal device 100 such as the captured overhead view image 61 and the map image 69 of FIG. 4 (discussed below with reference to FIG. 15). A user of the terminal device 100 watches camera lines displayed on a display screen, and then can intuitively learn whether or not there is a camera capable of imaging a three-dimensional selection position from a different angle from the angle of the camera capturing the captured image that the user is currently watching. If any, the user of the terminal device 100 can also intuitively learn what positional relationship the camera capturing the captured image that the user is currently watching and the three-dimensional selection position have.

FIG. 14 is an explanatory diagram for describing an example of camera lines in the three-dimensional virtual space corresponding to the center office 10.

FIG. 14 illustrates the three-dimensional virtual space 90 corresponding to the center office 10. There are objects 91A and 91B disposed in the three-dimensional virtual space 90. The object 91A corresponds to a certain person (e.g. Mr. A), and is disposed at the three-dimensional virtual position corresponding to the position of the certain person's seat in the center office 10. The object 91B corresponds to a certain person (e.g. Mr. B), and is disposed at the three-dimensional virtual position corresponding to the position of the certain person's seat in the center office 10. Similarly to the example of FIGS. 8 and 9, the object 91 is a cylindrical object having the radius R and the height H. FIG. 14 also illustrates the three-dimensional centroids 92A and 92B of the objects 91A and 91B, respectively.

Furthermore, there are virtual cameras 93C, 93D, and 93E disposed in the three-dimensional virtual space 90, and the respective virtual camera positions (such as the central positions of the virtual cameras) 94C, 94D, and 94E are also illustrated. FIG. 14 illustrates line segments having the three-dimensional centroid 92A of the object 91A and the virtual camera positions 94C, 94D, and 94E as the respective ends (i.e. camera lines 95C, 95D, and 95E). FIG. 14 also illustrates a camera line 95F having the three-dimensional centroid 92B of the object 91B and the virtual camera position 94C as the respective ends just for reference. The object 91B is not included within the imaging ranges of the virtual cameras 93C and 93E, but within only the imaging range of the virtual camera 93D in this example. Accordingly, there is only one camera line for the object 91B.

Figure 15:
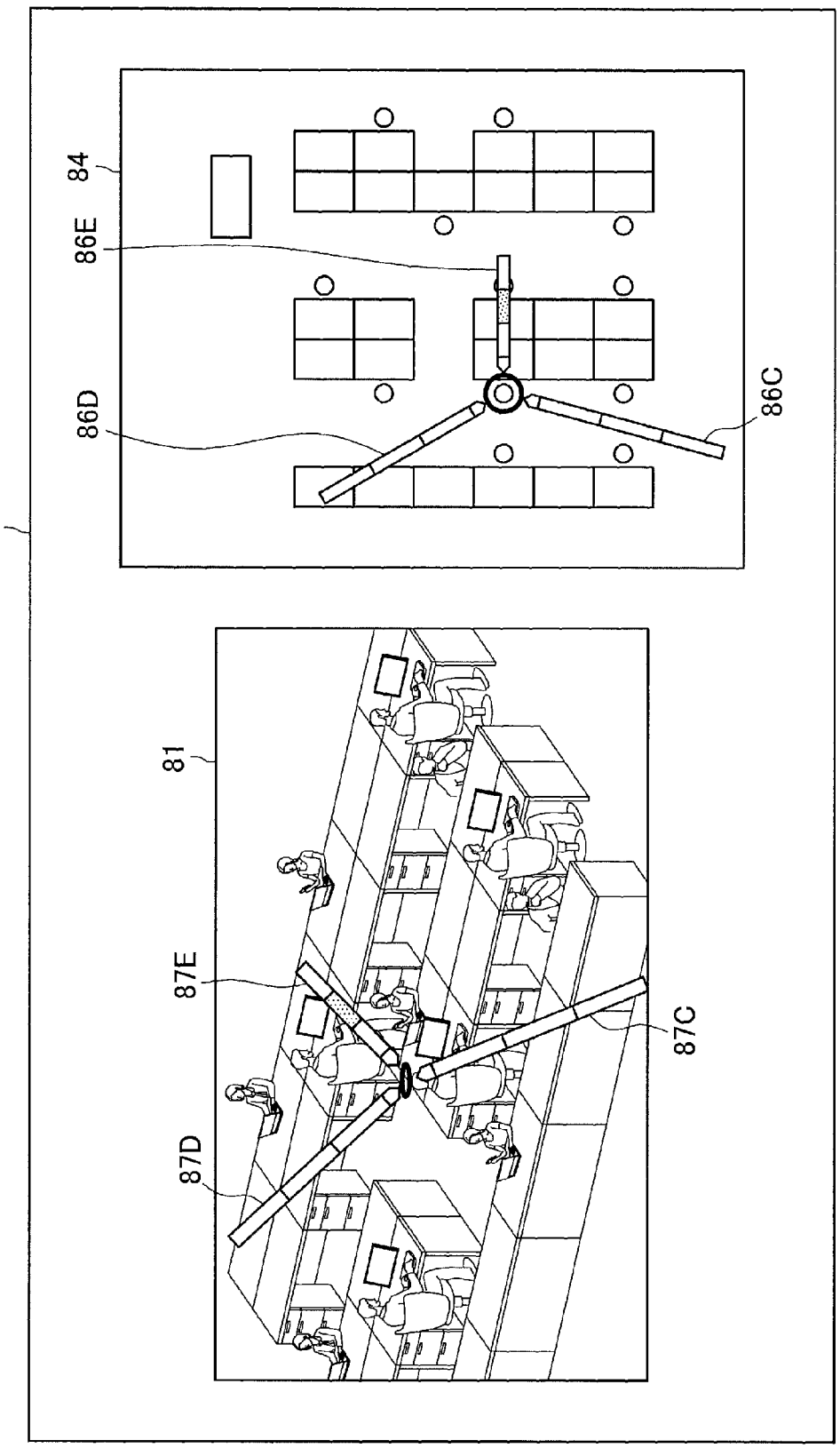
FIG. 15 is an explanatory diagram for describing an example of camera lines displayed on a display screen of the terminal device.

FIG. 15 is an explanatory diagram for describing an example of camera lines displayed on a display screen of the terminal device 100.

FIG. 15 illustrates the display screen 80 displayed in the overhead view mode or the proximity mode. The display screen 80 includes a captured image 81, a map image 84, and projected and superimposed camera lines 87C, 87D, 87E, 86C, 86D, and 86E. Additionally, there is a toroidal mark superimposed around the picture of the person corresponding to the object according to a position specified in the captured image 81, and this mark results from feedback to an operation of a user to indicate which object corresponds to the specified position on the screen.

The captured image 81 is the same kind of image as the captured overhead view image 61 and the captured proximity image 71. The map image 84 is the same kind of image as the map image 69 and the map image 75. In other words, a camera line can be displayed in both the overhead view mode and the proximity mode.

The camera line 87 is superimposed close to an image of an object by an operation of a user to specify the image of the object (e.g. operation of touching the position of the object) in the captured image 81. When the object is specified on the map image 84, the camera line 86 is superimposed. A camera line drawn on the display screen 80 here is a line obtained by projecting a camera line in the three-dimensional virtual space 90 corresponding to the center office 10 onto the two-dimensional plane of the captured image 81 or the map image 84, and the two-dimensional line segment having an object shown in the captured image 81 and the camera as the respective ends serves as a drawing element.

Additionally, at least one of the camera and the object does not necessarily have to be projected into the captured image 81. A part of the three-dimensional line that is not projected into the captured image 81 may be then drawn to stick out from the captured image 81 or does not also have to be drawn. Even if a part of the three-dimensional line that is not projected into the captured image 81 is not drawn, a user can roughly grasp the position of the camera or the object corresponding to the camera line by estimating the extending direction of the line segment drawn in the captured image 81.

Additionally, at least one of the camera and the object does not necessarily have to be projected into the display screen 80. A part of the three-dimensional line that is not projected into the display screen 80 then does not have to be drawn. Even if a part of the three-dimensional line that is not projected into the display screen 80 is not drawn, a user can roughly grasp the position of the camera or the object corresponding to the camera line by estimating the extending direction of the line segment drawn in the display screen 80.

Furthermore, a camera line may serve as not only a display element, but also an input element. An operation of specifying any one of the camera lines by touch thus allows a user to specify the camera 11 in the real space which corresponds to the specified and input camera line. The captured image 81 is switched to a captured overhead view image generated by the specified camera 11 in response to the specifying operation. The specifying operation is performed by the real space information providing unit 181 acquiring a captured overhead view image generated by the specified camera 11, and causing the display unit 150 to display the captured overhead view image.

The user can intuitively learn the positional relationship between the specified object and a camera to which the current camera is switched on the basis of the camera line before an operation of switching a camera. The camera line itself functions as a controller of the input operation, thereby enabling an intuitive and easy input method for an operation of switching a camera.

For example, a conventional input method for an operation of switching a camera will be considered in which the terminal device 100 includes a camera switching button, and when the button is pushed down, the cameras 11 are switched in order specified by the system. The use of the input method does not allow a user to learn to which camera the current camera is switched until the user watches a captured overhead view image of the switched camera, which frequently leads to problems (spatial discontinuities) that the user fails to learn the positional relationship between the plurality of cameras and is cognitively confused. The input method according to the present embodiment which uses a camera line can improve such a conventional input method for an operation of switching a camera.

The camera line further has an advantage with respect to an operation input in addition to the above-described advantages. For example, a user can specify and input the zoom ratio of the switched camera by performing an operation of specifying any one of the camera lines by touch which are displayed after specifying and inputting an object, and then further performing an operation of specifying any position on the specified camera line by touch.

For example, if a user specifies an area around the middle of a camera line by touch, the user is considered to have specified a viewpoint position that allows the user to watch an object from the position of the middle point between the object and the camera serving as the ends of a camera line segment, the current camera is switched to the camera corresponding to the specified camera line, and an image from the switched camera is displayed on the captured image 81 as a captured proximity image having a two-fold zoom ratio. Similarly, if a user specifies a position on about a third of a camera line from the object side end point by touch, a captured proximity image that is captured by the camera corresponding to the camera line and has a three-fold zoom ratio is displayed on the captured image 81.

Additionally, as described above, at least one of the camera and the object does not necessarily have to be projected into the captured image 81. The position of one of the camera side end point and the object side end point of the camera line which is projected to the outside of the captured image 81 may be used to compute a zoom ratio, or may be corrected to the edge of the captured image 81 (e.g. intersection between a camera line of the captured image and the edge of the captured image) and then used to compute a zoom ratio.

Additionally, at least one of the camera and the object does not necessarily have to be projected into the display screen 80. The position of one of the camera side end point and the object side end point of the camera line which is projected to the outside of the display screen 80 may be used to compute a zoom ratio, or may be corrected to the edge of the display screen 80 (e.g. intersection between a camera line in the display screen and the edge of the display screen 80) and then used to compute a zoom ratio.

Instead of making a plurality of touch inputs, a user can also efficiently make a single integrated touch input in the two types of input method for a camera line (i.e. a touch input for selecting and specifying, from a plurality of camera lines, a camera to which the current camera is switched and a touch input for specifying a zoom ratio for the selected single camera line).

For example, a user first pushes down an image area of an object in the captured image 81 with a finger, and then the camera line corresponding to the camera 11 capable of imaging the object is superimposed on the display screen 80. The user can then input and specify a camera that captures a desired captured image, and input and specify the magnification into the system with a single touch input (drag) by dragging the finger from the position of the object on the screen to a position on a desired camera line without releasing the finger from the display screen or the touch panel 820, and afterwards, releasing the finger from the touch panel 820.

Three-stepped specification input operations have been conventionally required to specify an object, to specify a desired camera to which the current camera is switched, and to specify the zoom magnification of the camera, but the introduction of the method according to the present embodiment makes it possible to make the inputs with a single touch input in this way, which significantly improves the usability of a user who uses a remote video transmission application having a function of switching a plurality of cameras from the perspective of efficiency.

Figure 16A:
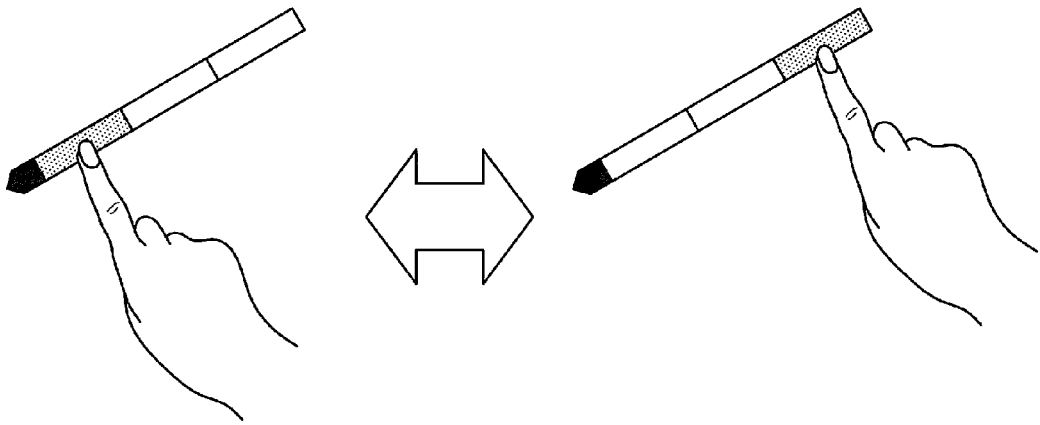
FIG. 16A is an explanatory diagram for describing an example in which a touch input is made to specify a position on a camera line and feedback thereto is displayed.
Figure 16B:
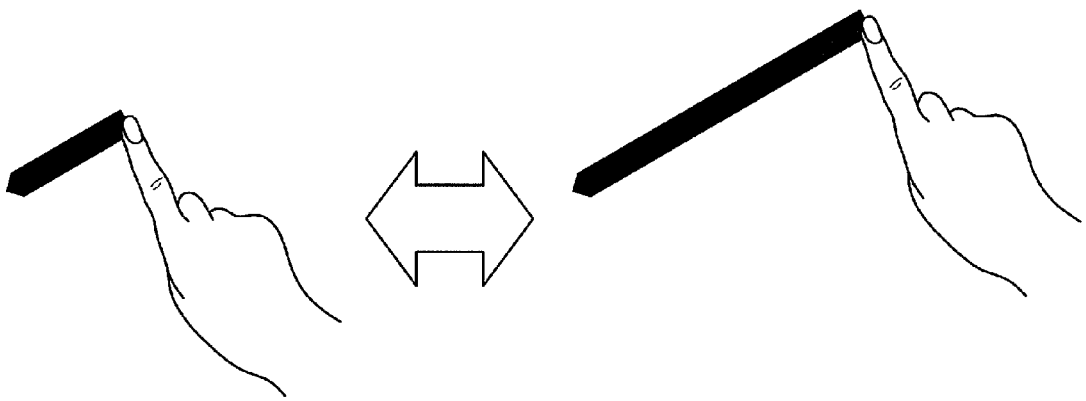
FIG. 16B is an explanatory diagram for describing an example in which a touch input is made to specify a position on a camera line and feedback thereto is displayed.
Figure 16C:
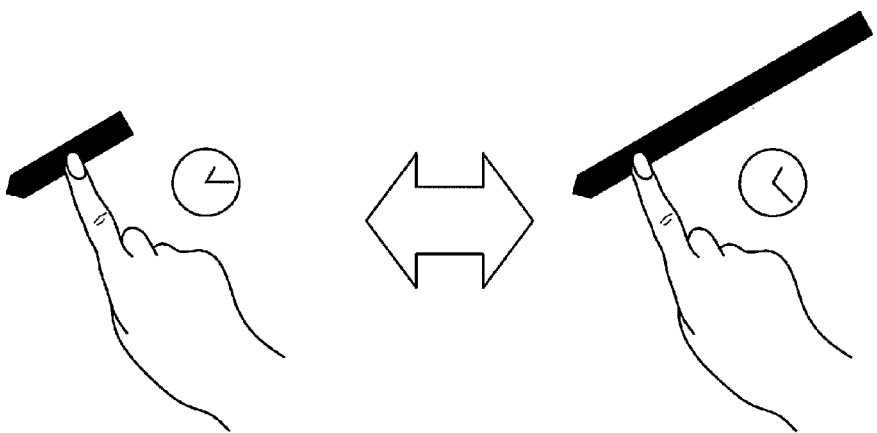
FIG. 16C is an explanatory diagram for describing an example in which a touch input is made to specify a position on a camera line and feedback thereto is displayed.

FIGS. 16A to 16C are explanatory diagrams for describing some examples in which a touch input is made to specify a position on a camera line and feedback thereto is displayed. Each of FIGS. 16A to 16C illustrates a camera line displayed on the display screen 80 and a hand of a user who is making a touch input to the camera line.

When a user specifies a position on a camera line with a tap input or a drag input, the partial area corresponding to the position on the camera line changes in color or density in the example illustrated in FIG. 16A, thereby returning feedback information to the user with respect to the specified input position.

A user performs an input operation of moving an end point of a camera line (the user performs an input operation of changing the length of the camera line), thereby specifying a position on the camera line by using the end point in the example illustrated in FIG. 16B. The touch input method used here is preferably drag. Additionally, the maximum length of a camera line that can be specified may be displayed in advance.

The example illustrated in FIG. 16C is the same as the example of FIG. 16B in that a user performs an input operation of changing the length of a camera line, thereby specifying a position on the camera line. However, the length of the camera line is not adjusted by dragging an end point of the camera line, but instead, pressing and holding (long-pressing) an area on the camera line cause the end point to move in accordance with the length of the pressing time in the example illustrated in FIG. 16C. Additionally, feedback may be displayed that shows a partial area changing its position like FIG. 16A in accordance with the length of the pressing time.

Figure 17:
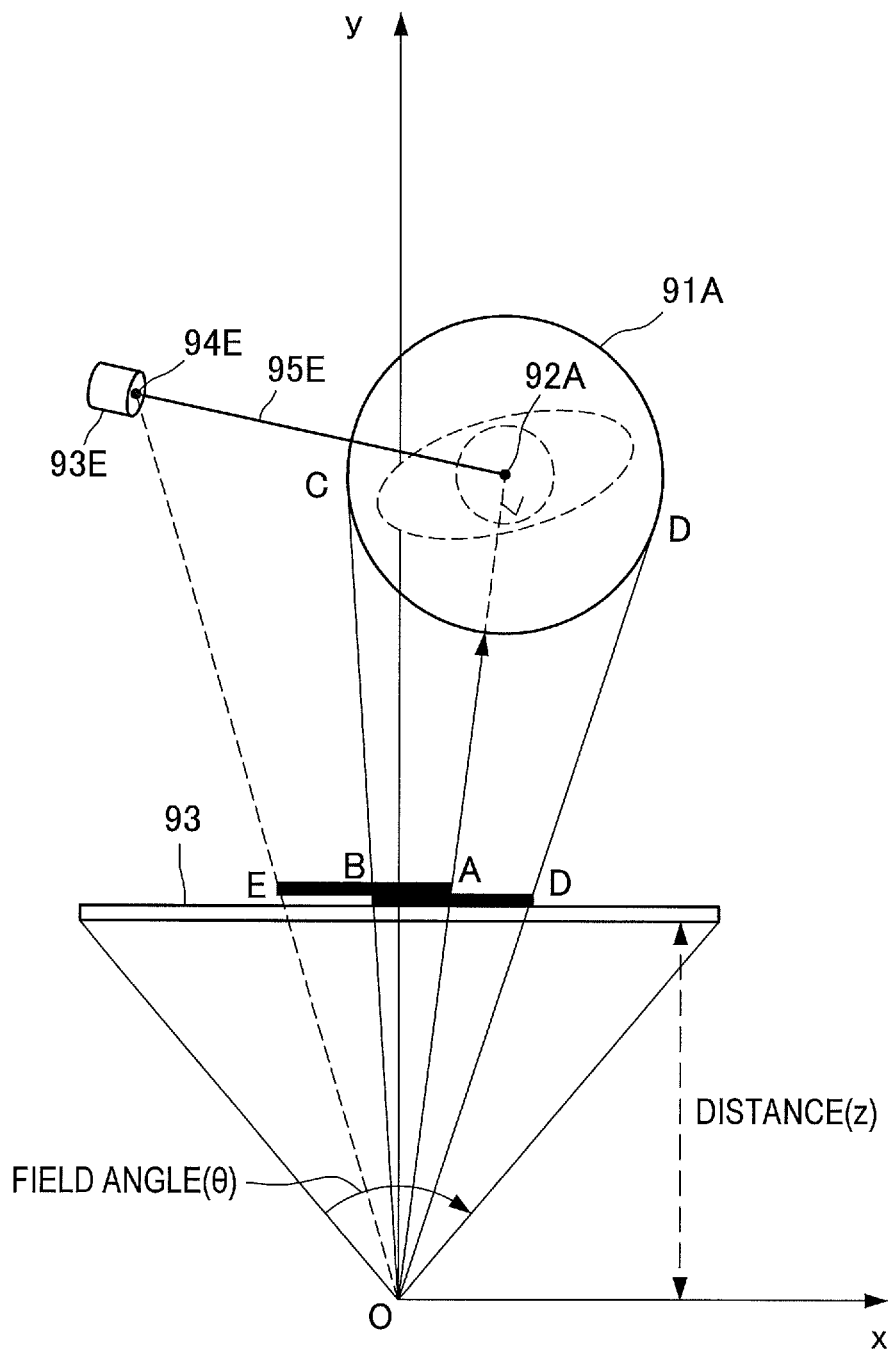
FIG. 17 is an explanatory diagram for describing an example in which an object disposed in the three-dimensional virtual space illustrated in FIG. 14 is selected.

FIG. 17 is an explanatory diagram for describing an example in which an object disposed in the three-dimensional virtual space illustrated in FIG. 14 is selected. FIG. 17 illustrates a positional relationship on the horizontal plane in the three-dimensional virtual space 90 for ease of understanding. Specifically, FIG. 17 illustrates the object 91A disposed in the three-dimensional virtual space 90, the virtual camera position O of the camera 11A that is currently used for capturing an image, the virtual camera position 94E of the virtual camera 93E corresponding to the camera 11B that serves as a camera to which the current camera is switched, and the camera line 95E of the camera 11B. Similarly to FIG. 9, FIG. 17 illustrates the axis y, the axis x, the field angle θ, and the virtual plane 93. It is assumed in this example for ease of understanding, similarly to FIG. 9, that the camera 11 is installed to have the imaging direction parallel to the horizontal plane.

For example, positions in the captured image are specified by a user as illustrated in FIG. 7. If the technique described with reference to FIG. 9 is used in this case, the camera line control unit 191 performs conversion processing of projecting the camera line (camera line 95E in this example) corresponding to the position in the captured image onto A to E areas on the virtual plane 93, and causes the display unit 150 to display the camera line. If a user makes a touch input into the A to E areas, the camera line control unit 191 acquires the camera line corresponding to the touch specification and information on the two-dimensional specification position on the camera line via the input unit 120, and obtains the three-dimensional virtual position corresponding to the two-dimensional specification position through conversion.

The obtained three-dimensional virtual position is used as information on a user viewpoint position desired by the user in the three-dimensional virtual space 90. As discussed above, the terminal device 100 including the camera line control unit 191 performs processing of switching the current camera to the camera 11 corresponding to the user viewpoint position and magnification specification zoom processing on the camera 11, and performs processing of displaying the captured proximity image corresponding to the captured image 81 on the display unit 150 and processing of displaying a new camera line on the captured proximity image.

As described above, the camera line control unit 191 can perform operations of calculating various parameters related to a camera line and camera line display control, and can acquire a user input into the camera line.

(Camera Line Sorting Unit 193)

When there are a plurality of camera lines (e.g. a plurality of camera lines are present close to each other), the camera line sorting unit 193 performs processing of narrowing the plurality of camera lines (present close to each other) down to a single camera line that is the most suitable for the condition and presenting the most suitable camera line to a user in order to solve the problems that there occurs an error in specifying and inputting a camera line drawn on the display screen 80 and it is difficult to specify and input the camera line.

Figure 18:
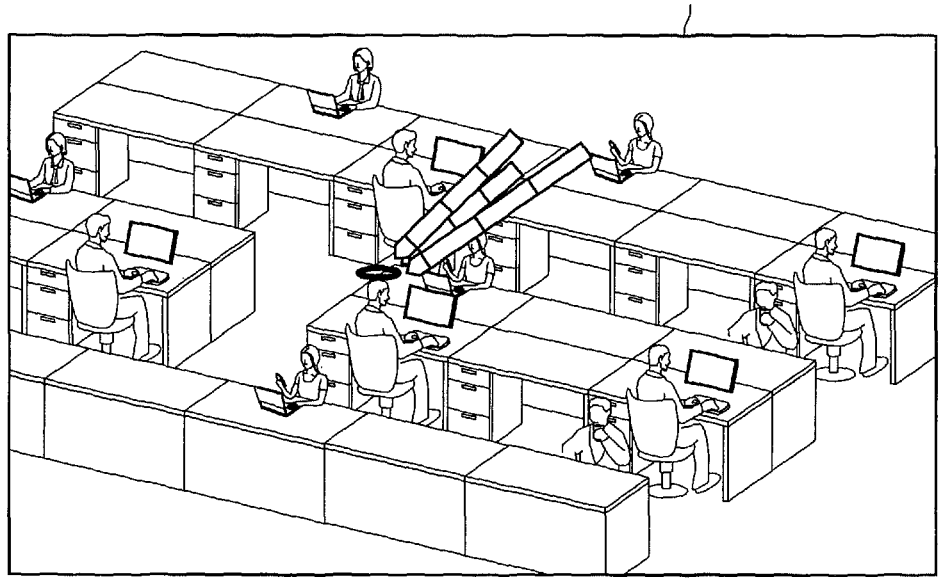
FIG. 18 is an explanatory diagram for describing an example of a display screen of a terminal device 100 in which there are a plurality of camera lines close to each other.

FIG. 18 is an explanatory diagram for describing an example of a display screen of the terminal device 100 in which there are a plurality of camera lines close to each other. The following describes processing performed when the camera lines are present close to each other as an example. However, whether or not the camera lines are present close to each other, similar processing may be equally performed in the presence of a plurality of camera lines.

FIG. 18 illustrates the captured image 81 displayed in the overhead view mode or the proximity mode. FIG. 18 illustrates the object corresponding to a position specified by a user, and three superimposed camera lines corresponding thereto. The three camera lines are present at very nearby display positions, and it is thus difficult for a user to select a single desired camera line from the three camera lines and to make a touch input. Accordingly the user possibly selects and inputs an unintended camera line by error in some cases. Before the user can make an input, the user is confronted with the problem that the plurality of camera lines close to each other prevent the user from visually recognizing each of the displayed camera lines. The camera line sorting unit 193 performs information processing of overcoming the above-described situation.

Specifically, the camera line sorting unit 193 performs processing of comparing a plurality of camera lines present close to each other in accordance with a camera line evaluation condition discussed below, sorting out the camera line that has been evaluated the most highly as the most suitable camera line, and displaying the single camera line alone on the display screen 80.

The following demonstrates several examples of the comparison processing corresponding to the camera line evaluation condition.

A first camera line evaluation condition is the "distance" between the object corresponding to a position specified by a user and the camera 11. The distance is synonymous with the full length of a camera line, and can be obtained in FIG. 14 by calculating the full length of the camera line 95C (or 95D or 95E), or the distance between the two points of the three-dimensional positions 92A and 94C (or 94D or 95E). As a criterion for high/low comparative evaluation, for example, camera lines having larger distance values may be evaluated more highly. This is because, for example, the cameras 11 having the same performance make the field view of the captured image 81 wider with an increase in distance and allows a user to more widely grasp even the situation of an area around a position/object specified by the user, and a longer distance allows a user to select a wider range of zoom ratios and allows a user to more freely decide a viewpoint, so that a user would be enjoy more excellent advantageous effects.

A second camera line evaluation condition is the "angle" formed between a camera line and the horizontal plane (floor) in the three-dimensional virtual space 90 corresponding to the center office 10. The angle can be obtained in FIG. 14 by calculating the angles of three points 94C-92A-94C' (i.e. angles of the three-dimensional positions 92A and 94C, and the point 94C' obtained by orthogonally projecting the three-dimensional position 94C onto the horizontal plane (floor) of the three-dimensional virtual space 90 vertically) on the basis of the cosine theorem or the like. As a criterion for high/low comparative evaluation, for example, camera lines having smaller angle values close to 0 may be evaluated more highly. This is because a smaller angle against the horizontal plane of the floor makes the light ray of a camera line leveler, makes a target person specified by a user look more natural from the interpersonal perspective (while an overhead image of a person captured from a high angle looks like the person is watched from a surveillance camera) and makes the user feel zoom more natural as if the user was walking to the target person (while zooming in on the target person at a high angle makes the user feel unnatural as if the user was gliding through the air), so that the user would enjoy more excellent advantageous effects.

A third camera line evaluation condition is the "performance" of the camera 11 corresponding to each camera line, and comes into effect when each of the cameras 11 belongs to a different model and has a different characteristic. The performance means, for example, the hardware performance of a camera. Some examples of the hardware performance will be described in conjunction with a criterion example for high/low comparative evaluation: the number of pixels in an image sensor (more pixels result in higher evaluation), the area of an image sensor (a larger area results in higher evaluation), the field angle of a lens (a wider field angle results in higher evaluation), the f-number of a lens (a smaller f-number results in higher evaluation), the shutter speed (higher shutter speed results in higher evaluation), the maximum frame rate (a higher frame rate results in higher evaluation), the maximum ISO speed (higher ISO speed results in higher evaluation), the presence/absence of an optical zoom mechanism (a camera having an optical zoom mechanism results in higher evaluation), the photographable distance (a wider range of distance results in higher evaluation), etc. The reason of the criterion for high/low comparative evaluation is that cameras evaluated more highly would more probably provide captured images of higher quality to users.

In addition, the camera line sorting unit 193 determines whether or not the plurality of camera lines obtained by the camera line control unit 191 are present close to each other, and whether to perform the sorting processing. Regarding the determination about whether the plurality of camera lines are present close to each other, for example, when the display areas of a plurality of camera lines drawn on the display screen 80 overlap with each other, or the distances between the display areas of the plurality of camera lines are shorter than or equal to a predetermined two-dimensional distance (e.g. the distances are shorter than or equal to 7 mm, or less than or equal to 44 pixels), the camera line sorting unit 193 may determine that the corresponding camera line group are positioned close, and that the sorting processing is to be performed. When the angles formed between a plurality of camera lines in the three-dimensional virtual space 90 are smaller than or equal to a predetermined angle (e.g. smaller than 10 degrees), the camera line sorting unit 193 may determine that the corresponding camera line group are positioned close, and that the sorting processing is to be performed.

As described above, the camera line sorting unit 193 can perform processing of comparing a plurality of camera lines present close to each other in accordance with a camera line evaluation condition discussed below, and sorting out the camera line that has been evaluated the most highly as the most suitable camera line. The camera line sorting unit 193 can then perform processing of displaying the single camera line alone on the display screen 80.

<2-3. Software Configuration>

Figure 19:
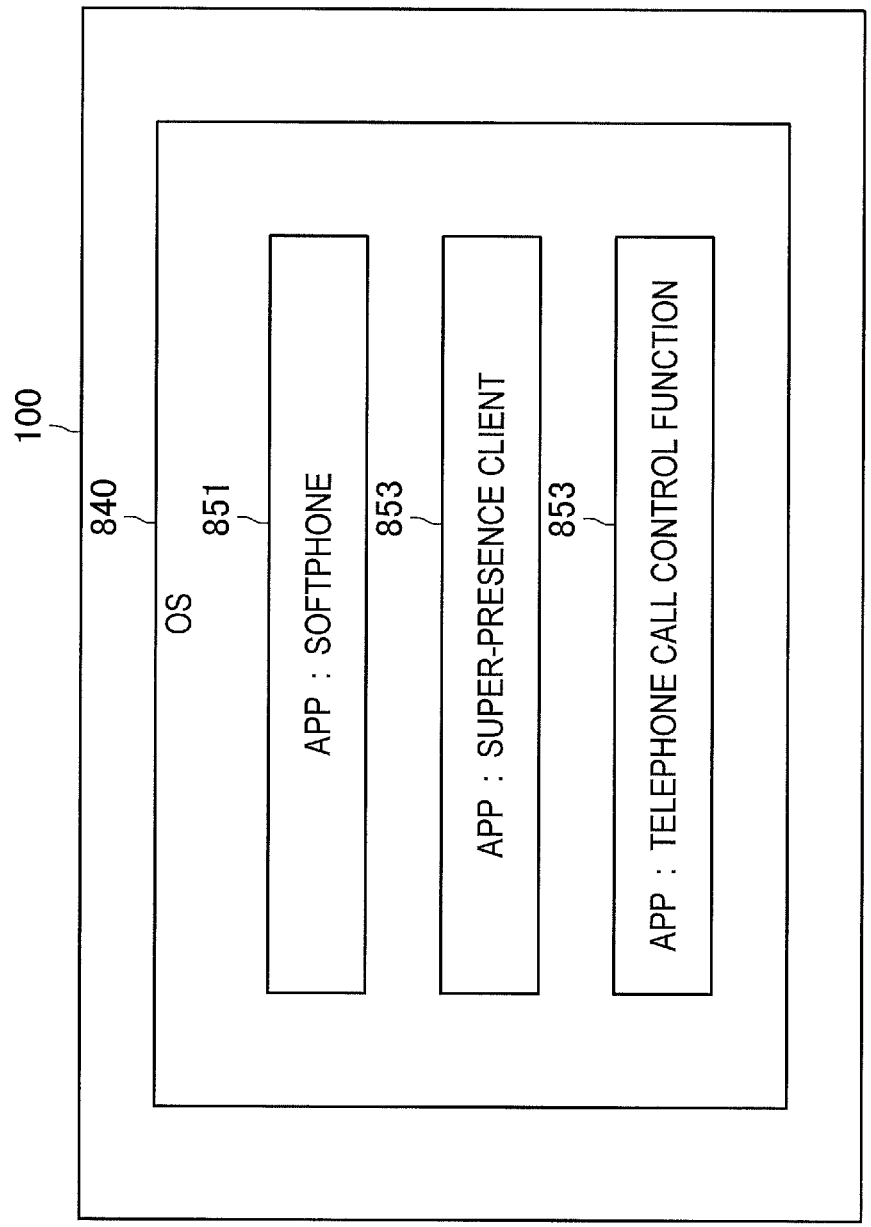
FIG. 19 is a block diagram illustrating an example of a software configuration of a terminal device according to an embodiment.

Next, an example of the software configuration of the terminal device 100 according to the present embodiment will be described. FIG. 19 is a block diagram illustrating an example of the software configuration of the terminal device 100 according to the present embodiment. FIG. 19 illustrates that the terminal device 100 includes an operating system (OS) 840 and application software. The terminal device 100 includes a softphone 851, a super-presence client 853, and a telephone call control function 855 as application software.

The OS 840 is software that provides a basic function for operating the terminal device 100. The OS 840 executes application software.

The softphone 851 is application software for allowing a user to make a telephone call by using the terminal device 100. The telephone unit 189 may be implemented, for example, by the softphone 851.

The super-presence client 853 is application software for providing information on a real space to the terminal device 100. The real space information providing unit 181 may be implemented, for example, by the super-presence client 853.

Additionally, the super-presence client 853 may acquire state information indicating the state of a person in a real space (such as the center office 10), and provide the state information to the softphone 851 via the OS 840. The softphone 851 may then control a telephone call on the basis of the state information.

Meanwhile, the telephone call control function 855 is application software that acquires the communication ID of the communication device of a person shown in a captured image in a display screen. The position acquisition unit 183, the object selection unit 185, and the ID acquisition unit 187 may be implemented by the telephone call control function 855.

When the telephone call control function 855 acquires the communication ID, the telephone call control function 855 provides the communication ID to the softphone 851 via the OS 840. The softphone 851 then makes a telephone call by using the communication ID.

<<3. Configuration of Information Management Server>>

Figure 20:
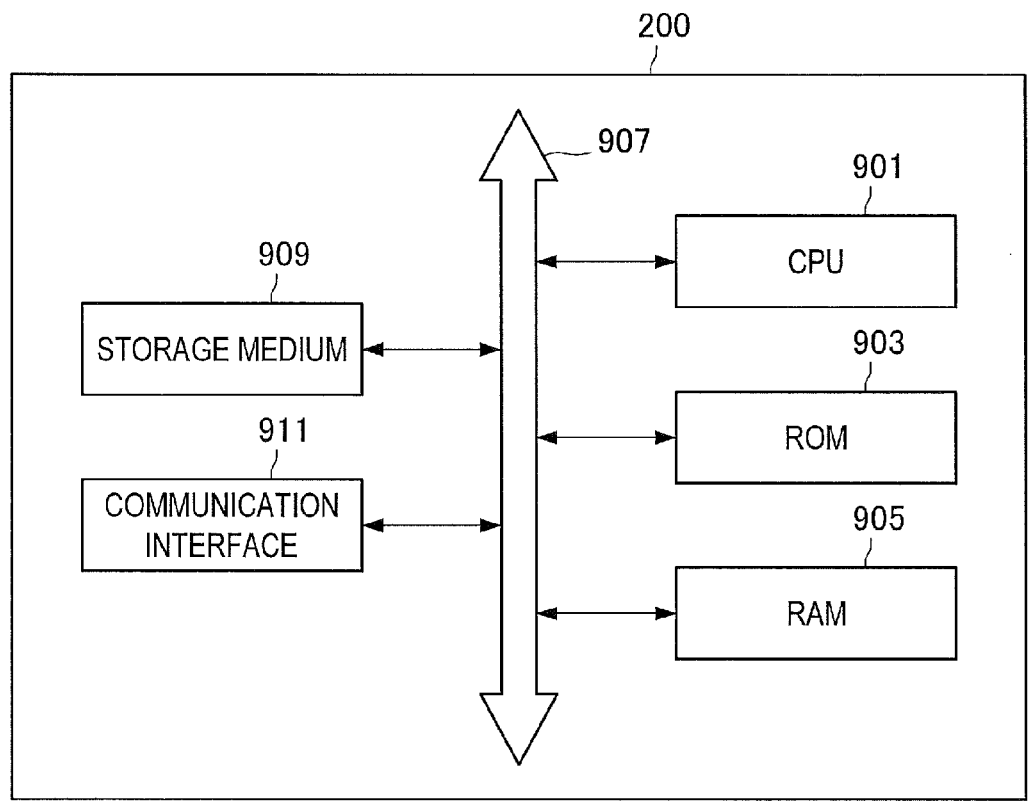
FIG. 20 is a block diagram illustrating an example of a hardware configuration of an information management server according to an embodiment.
Figure 21:
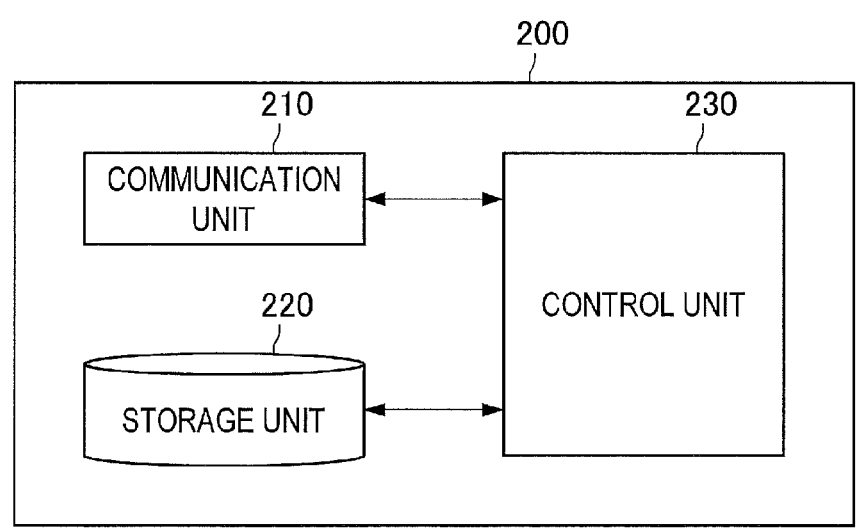
FIG. 21 is a block diagram illustrating an example of a functional configuration of an information management server according to an embodiment.

Next, an example of the configuration of the information management server 200 according to the present embodiment will be described with reference to FIGS. 20 and 21.

<3-1. Hardware Configuration>

First of all, an example of the hardware configuration of the information management server 200 according to the present embodiment will be described with reference to FIG. 20. FIG. 20 is a block diagram illustrating an example of the hardware configuration of the information management server 200 according to the present embodiment. FIG. 20 illustrates that the information management server 200 includes a CPU 901, ROM 903, RAM 905, a bus 907, a storage device 909, and a communication interface 911.

The CPU 901 executes various kinds of processing in the information management server 200. The ROM 903 stores a program and data that make the CPU 901 execute the processing in the information management server 200. Meanwhile, the RAM 905 temporarily stores a program and data when the CPU 901 executes the processing.

The bus 907 connects the CPU 901, the ROM 903, and the RAM 905 to each other. The bus 907 is further connected to the storage device 909 and the communication interface 911. The bus 907 includes, for example, some types of bus. The bus 907 includes a high-speed bus that connects the CPU 901, the ROM 903 and the RAM 905 to each other, and one or more other buses that are lower than the high-speed bus in speed as an example.

The storage device 909 stores data that are to be temporarily or permanently saved in the information management server 200. The storage device 909 may be a magnetic storage device such as a hard disk, or non-volatile memory such as EEPROM, flash memory, MRAM, FeRAM, and PRAM.

The communication interface 911 is a communication means included in the information management server 200, and communicates with an external device via a network (or directly). The communication interface 911 may be an interface for wireless communication. In this case, the communication interface 811 may include, for example, a communication antenna, an RF circuit, and other communication processing circuits. The communication interface 911 may be an interface for wired communication. In this case, the communication interface 911 may include, for example, a LAN terminal, a transmission circuit, and other communication processing circuits.

<3-2. Functional Configuration>

Next, an example of the functional configuration of the information management server 200 according to the present embodiment will be described. FIG. 21 is a block diagram illustrating an example of the functional configuration of the information management server 200 according to the present embodiment. FIG. 21 illustrates that the information management server 200 includes a communication unit 210, a storage unit 220, and a control unit 230.

(Communication Unit 210)

The communication unit 210 communicates with another device. For example, the communication unit 210 is directly connected to the LAN 19, and communicates with each device in the center office 10. Specifically, for example, the communication unit 210 communicates with the camera 11, the microphone 13, the sensor 15, and the media distribution server 17. The communication unit 210 also communicates with each device in the satellite office 20 via the external network 30 and the LAN 23. Specifically, for example, the communication unit 210 communicates with the terminal device 100 and the display 21. Additionally, the communication unit 210 may be implemented, for example, by the communication interface 911.

(Storage Unit 220)

The storage unit 220 stores a program and data for operating the information management server 200.

The storage unit 220 stores various kinds of information used in the information processing system especially in the present embodiment.

As a first example, the storage unit 220 stores parameters for the camera 11, the microphone 13, and the sensor 15. The specific details of the parameters have already been described above.

The storage unit 220 stores data of the three-dimensional virtual space corresponding to a real space as a second example. The three-dimensional virtual space is, for example, modeled after the center office 10. The specific details of the three-dimensional virtual space have already been described above.

As a third example, the storage unit 220 stores person related information. The person related information pertains, for example, to a person in the center office 10. The specific details of the person related information have already been described above.

As a fourth example, the storage unit 220 stores the object ID and the communication ID of an object disposed in a three-dimensional virtual space in association with each other. The specific details of the object ID and the communication ID have already been described above.

(Control Unit 230)

The control unit 230 provides a variety of functions of the information management server 200.

For example, the control unit 230 provides various kinds of information used in the information processing system in response to a request. For example, the control unit 230 provides data of a three-dimensional virtual space, person related information, the communication ID corresponding to an object ID, and parameters for the camera 11, the microphone 13, and the sensor 15 in response to a request from the terminal device 100.

For example, the control unit 230 updates various kinds of information used in the information processing system as necessary. The control unit 230 updates the information automatically or in accordance with a manual instruction.

<<4. Processing Steps>>

Figure 22:
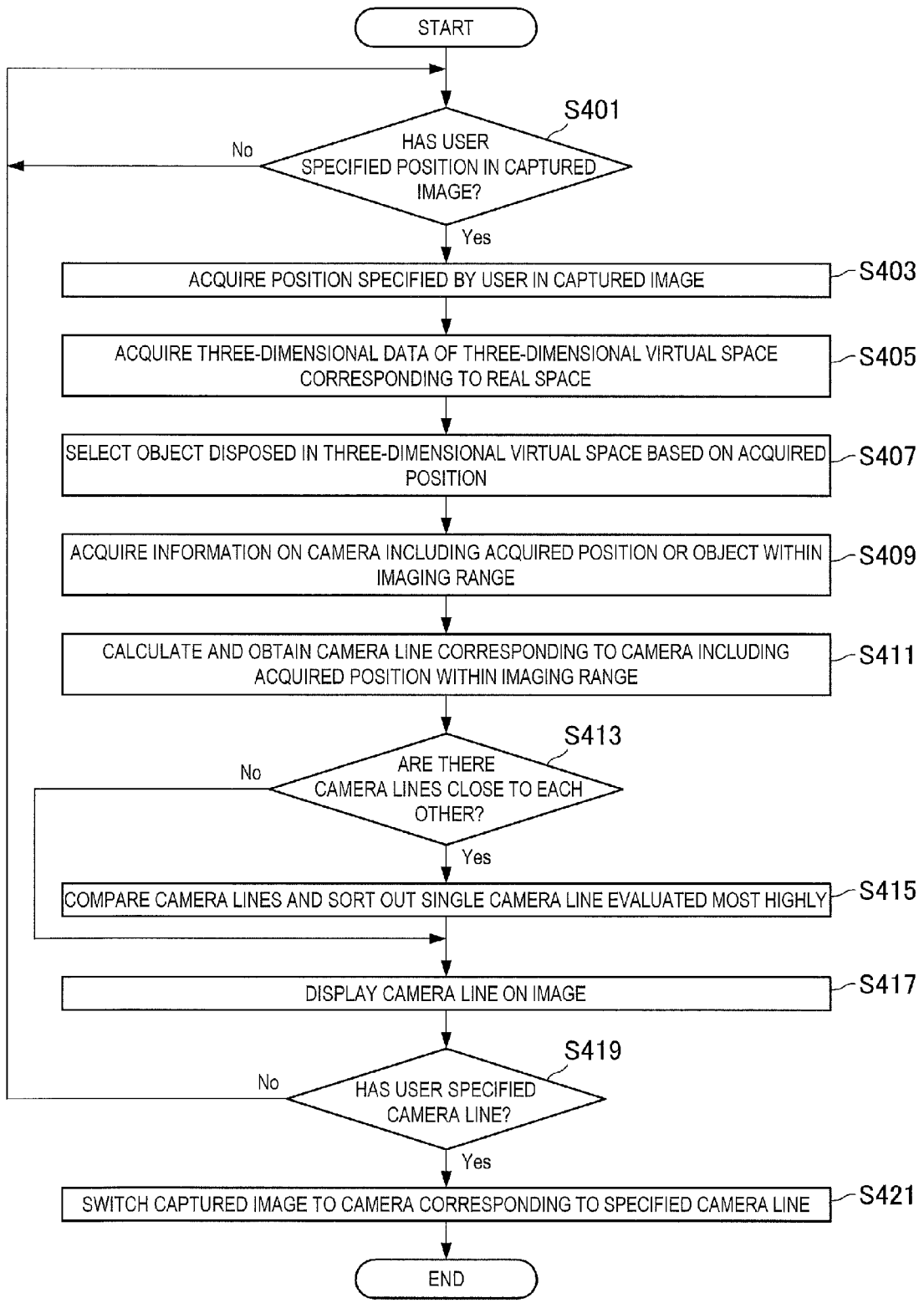
FIG. 22 is a flowchart illustrating an example of schematic steps of information processing according to an embodiment.

Next, an example of information processing according to the present embodiment will be described with reference to FIG. 22. FIG. 22 is a flowchart illustrating an example of schematic steps of information processing according to the present embodiment.

In step S401, the position acquisition unit 183 determines whether or not a user has specified a position in a captured image showing a real space in a display screen of the captured image. More specifically, for example, the position acquisition unit 183 determines whether the user has specified a position in a captured proximity image. If the position has been specified, the processing proceeds to step S403. If not, the processing repeats step S401.

In step S403, the position acquisition unit 183 acquires the position specified by the user in the captured image.

In step S405, the object selection unit 185 acquires data of the three-dimensional virtual space corresponding to the real space from the storage unit 170.

In step S407, the object selection unit 185 selects an object disposed in the three-dimensional virtual space on the basis of the acquired position in the captured image.

In step S409, the camera line control unit 191 acquires information on the camera 11 including the acquired position or the object corresponding to the acquired position within the imaging range.

In step S411, the camera line control unit 191 calculates and obtains a parameter constituting the camera line corresponding to the camera 11 on the basis of the information on the camera 11 including the acquired position or the object corresponding to the acquired position within the imaging range.

In step S413, the camera line sorting unit 193 determines whether or not there are a plurality of camera lines close to each other. If there are a plurality of camera lines close to each other, the processing proceeds to step S415. If not, the processing proceeds to step S417.

In step S415, the camera line sorting unit 193 performs processing of comparing a plurality of camera lines present close to each other in accordance with the above-described camera line evaluation condition, and sorting out the camera line that has been evaluated the most highly as the most suitable camera line.

In step S417, the camera line control unit 191 causes the camera line corresponding to the acquired position or the object corresponding to the acquired position to be displayed on the display screen 80.

In step S419, the camera line control unit 191 determines whether or not a user has specified one of the camera lines or a position on the camera line. If the camera line or the position has been specified, the processing proceeds to step S403. If not, the processing repeats step S401.

In step S421, the camera line control unit 191 acquires a captured image of the camera corresponding to the specified camera line and switches the acquired image and a captured image of the current camera at the specified zoom ratio on the display screen 80, and then the processing terminates. After the camera is switched, the corresponding camera line may be automatically re-calculated and re-drawn on the display screen. In this case, the processing may be resumed in S409.

As described above, the information processing according to the present embodiment is executed. Furthermore, an example of start processing executed before the information processing begins will be described with reference to FIG. 23.

Figure 23:
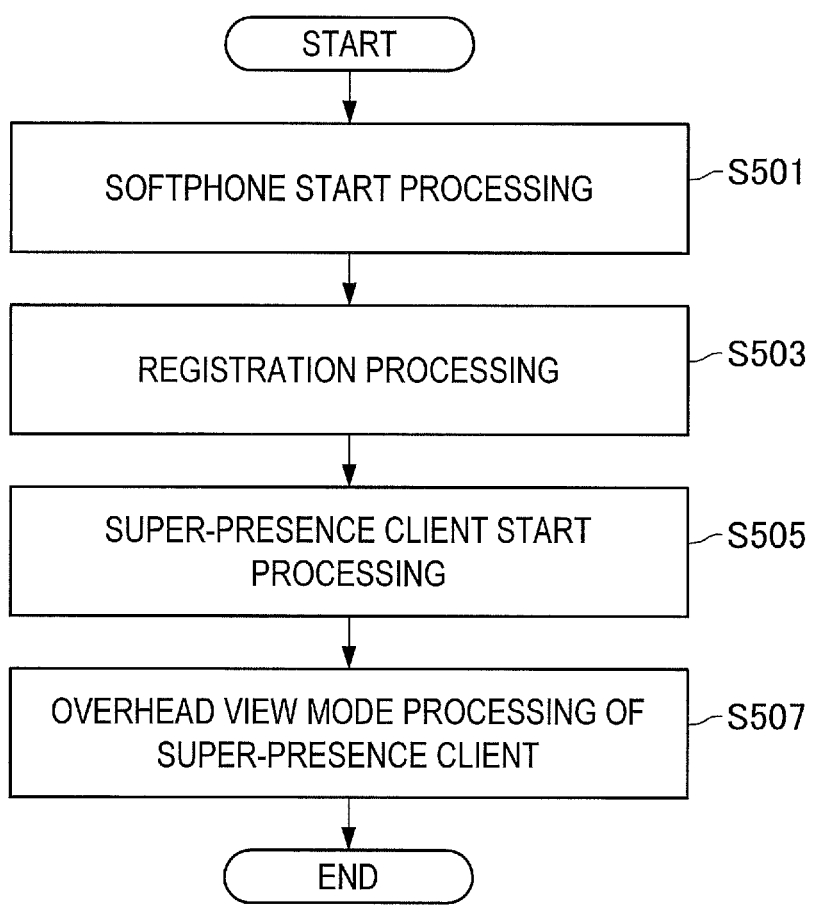
FIG. 23 is a flowchart illustrating an example of schematic steps of start processing according to an embodiment.

FIG. 23 is a flowchart illustrating an example of schematic steps of start processing according to the present embodiment.

In step S501, start processing of the softphone 851 is executed. This starts up the softphone 851.

In step S503, registration processing of the softphone 851 is executed. For example, as a kind of registration processing of the softphone 851, registration (such as SIP REGISTRATION) is conducted in the PBX 40.

In step S505, start processing of the super-presence client 853 is executed. For example, the camera 11, the microphone 13, the sensor 15, the media distribution server 17, and the information management server 200 are identified which are used in the super-presence client 853.

In step S507, overhead view mode processing of the super-presence client 853 is executed. The series of start processing then terminates.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

For example, an example has been described in which the three-dimensional virtual space for a center office is prepared as the three-dimensional virtual space corresponding to a real space, but an embodiment of the present invention is not limited thereto. For example, a plurality of three-dimensional virtual spaces may be prepared. As an example, the three-dimensional virtual space corresponding to a real space may be prepared for each of offices. For example, three-dimensional virtual spaces may also be prepared for satellite offices, home offices, and other center offices. In this case, the three-dimensional virtual space for each office may have a size according to the size of each office. An object selection unit of a terminal device may acquire data of a desired three-dimensional virtual space of three-dimensional virtual spaces. A three-dimensional virtual space may also be prepared for something other than an office.

An example has been described in which the object corresponding to a person is selected as long as the person is sitting on the seat, but an embodiment of the present invention is not limited thereto. For example, the object may also be selected even when the person is not sitting on the seat. As an example, when the person is sitting on the seat, the communication ID of the communication device installed at the seat may be acquired, and when the person is not sitting on the seat, the communication ID of the mobile terminal of the person may be acquired.

An example has been described in which a communication ID is a telephone number, but an embodiment of the present invention is not limited thereto. The communication ID may be any ID other than a telephone number. As an example, the communication ID may be a softphone ID other than the telephone number. As another example, the communication ID may be an ID for communication other than the telephone. For example, the communication ID may be an e-mail address, or an ID for short messages. In this case, e-mail or a short message may be transmitted with the communication ID.

An example has been described in which the communication ID corresponding to an object is acquired when the object is selected, but an embodiment of the present invention is not limited thereto. For example, when an object is selected, any identification information corresponding to the object may be acquired. As an example, when an object is selected, any identification information on the person corresponding to the object may be acquired. For example, the communication ID may be acquired on the basis of the identification information.

An example has been described in which an object (object selected by the object selection unit) disposed in the three-dimensional virtual space corresponding to a real space corresponds to a person, and is a cylindrical object, but an embodiment of the present invention is not limited thereto. For example, the object is not a cylindrical object, but may have a different shape. In addition, for example, the object may correspond to something other than a person. As an example, the object may correspond to an area of the real space. Specifically, for example, the object may correspond to a seat, and be disposed at the three-dimensional virtual position corresponding to the position of the seat. The communication ID of the communication device installed at the seat may correspond to the object, and when the object is selected, the communication ID may be acquired. The object may correspond to an area wider than a seat, and cover the three-dimensional virtual range corresponding to the range of the area. The communication ID of the communication device installed in the area may correspond to the object, and when the object is selected, the communication ID may be acquired.

An example has been described in which a user specifies the position of a captured image by touch on a display screen, but an embodiment of the present invention is not limited thereto. For example, the position of the captured image may be specified by a user with an input means other than a touch panel. For example, the position of the captured image may be clicked and specified by a mouse, or may be specified by other input means such as a button and a keyboard.

An example has been described in which a captured image generated by a camera, audio data generated by a microphone, and a result of a determination made by a sensor are respectively provided directly to a terminal device from the camera, the microphone, and the sensor, but an embodiment of the present invention is not limited thereto. For example, these kinds of data may be provided by another device. As an example, a server (such as a media distribution server) may acquire these kinds of data, and provide the data to the terminal device.

An example has been described in which a terminal device has the functions of a position acquisition unit, an object selection unit, an ID acquisition unit, and the like, but an embodiment of the present invention is not limited thereto. For example, these functions may be implemented by a device other than the terminal device. As an example, a server may have these functions.

An example has been described in which a terminal device displays a display screen of a captured image of a real space, but an embodiment of the present invention is not limited thereto. For example, the display screen may be displayed by another device. As an example, the display screen may be displayed by a display installed in a satellite office. The position of the captured image included in the display screen may be specified by a user on the display.

Processing steps in the information processing described herein do not necessarily have to be performed in the chronological order described in the flowcharts. For example, the processing steps in the information processing may be performed in order different from the order described as the flowcharts, or may be performed in parallel.

It is possible to produce a computer program for causing hardware such as a CPU, ROM, and RAM built in an information processing device (such as a terminal device) to execute a function corresponding to each structural element of the information processing device. There is also provided a storage medium having the computer program stored therein.

<<5. Modifications>>

<5-1. Modification 1: Notification Function at Time of Camera Line Sorting Processing>

Figure 24:
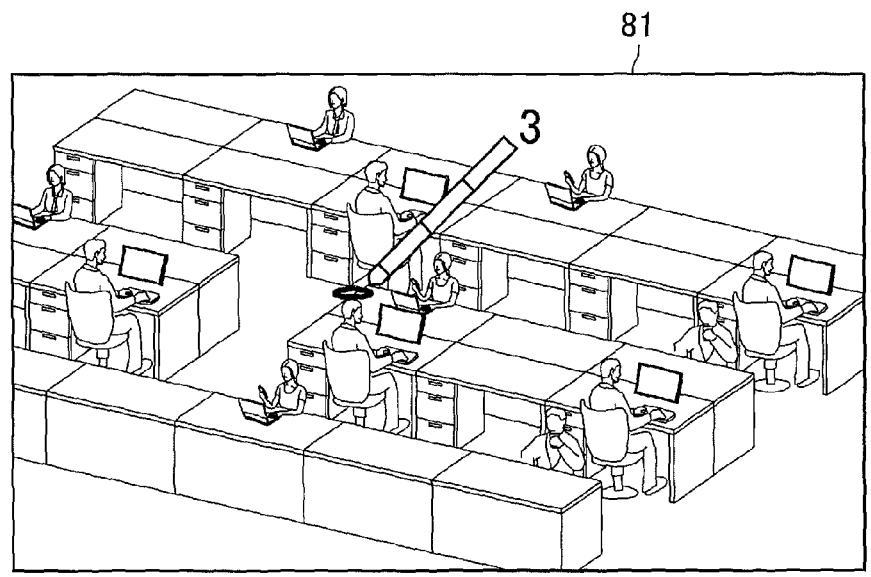
FIG. 24 is a diagram illustrating an example of display obtained by applying a function according to a modification 1 to FIG. 18.

As a modification 1, the camera line sorting unit 193 may have a function of, when the most suitable single camera line is sorted from a plurality of camera line candidates, and the most suitable single camera line alone is displayed, displaying the total number of camera line candidates around the most suitable single camera line. FIG. 24 is a diagram illustrating an example of display obtained by applying a function according to the modification 1 to FIG. 18. For example, when it is determined that there are three camera lines close to each other, and sorting processing is performed on the most suitable single camera line, the camera line sorting unit 193 may display not only the most suitable single camera line on the display screen 80, but also the number "3" around the most suitable single camera line on the display screen 80 as illustrated in FIG. 24.

This function allows a user to instinctively learn whether or not the sorting processing has been performed on the camera lines displayed on the display screen 80 (conversely, it is not possible for a user to learn whether or not the sorting processing has been performed on each camera line without this function). Furthermore, the mode may be switched to cancel the sorting processing and to display all the camera line candidates when the portion on which the total number of camera line candidates is displayed is touched.

<5-2. Modification 2: Acquisition Management Function of Performance Information in Camera Line Evaluation Condition>

As a modification 2, the camera line sorting unit 193 may have a function of, if the above-described camera line evaluation condition is the "performance" of the camera 11, evaluating the performance, and managing the performance information acquired as a result of the evaluation. For example, the camera line sorting unit 193 may make all the cameras 11 included in the system according to the present embodiment take test photographs for a short period of time, acquire the images, automatically analyze data of each acquired image, and estimate performance information on each camera 11. Alternatively, the camera line sorting unit 193 may acquire information on the performance from data of the exchangeable image file format (Exif) embedded in a photographed image of each camera 11 even without performing the image analysis processing.

The camera line sorting unit 193 may have a crawler program function of automatically crawling through web pages and collecting information, and collecting information on the performance of each camera 11 such as the specifications of the camera from the web pages. The camera line sorting unit 193 may further store and manage data of the performance information acquired as described above in cooperation with the information management server 200. When the camera line evaluation condition is the performance of the camera 11, this function reduces the load of a user to manually input and register the performance information on each camera 11 into the system according to the present embodiment.

<5-3. Modification 3: Function of Providing and Displaying Image Quality Related Information onto Camera Line>

As a modification 3, the camera line control unit 191 may have a function of changing the display of the corresponding camera line in accordance with the quality of a captured image of each camera 11. For example, when the camera C corresponding to the camera line 87C in the captured image 81 has 320×240 pixels for photography, the camera 11D corresponding to the camera line 87D in the captured image 81 has 1920×1200 pixels for photography, and the camera 11E corresponding to the camera line 87E in the captured image 81 has 640×480 pixels for photography in FIG. 15, a result of the high/low quality comparison between the photographed images shows the camera 11D>the camera 11E>the camera 11C.

Figure 25:
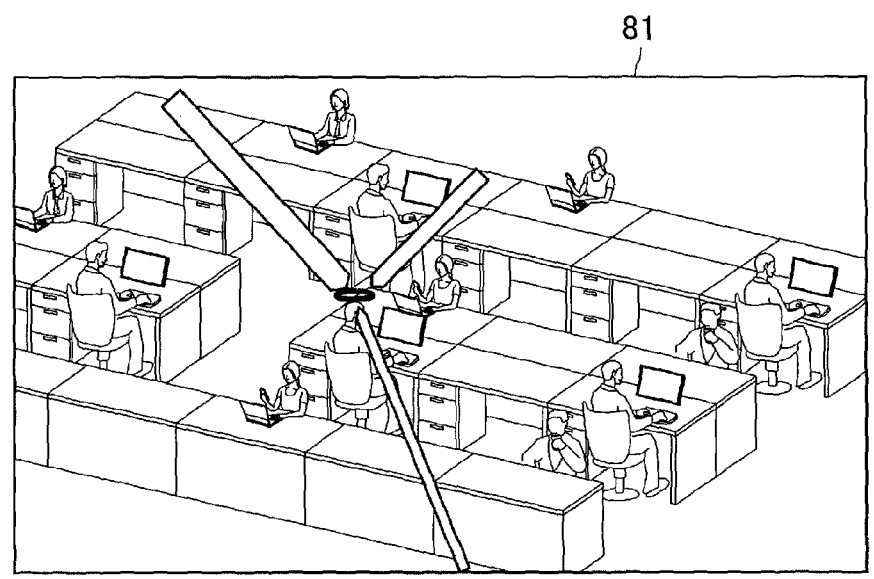
FIG. 25 is a diagram illustrating an example in which high/low qualities of photographed images are drawn in association with ways in which camera line are displayed.

However, it is not possible for a user to predict such a difference in the image quality before processing of switching the camera. Accordingly, the high/low quality of a photographed image is drawn in association with ways in which the camera lines are displayed as illustrated in FIG. 25, thereby allowing a user to intuitively grasp the quality of a photographed image acquired by a camera to which the current camera is switched in selecting a camera line before processing of switching the camera, to select a camera that offers a photographed image of higher quality, and to perform a switching operation. Although the high/low quality of a photographed image is represented by the thickness of a camera line in the example illustrated in FIG. 25, the high/low quality of a photographed image may be expressed, for example, by the color or the degree of display transparency of a camera line.

<5-4. Modification 4: Application of Present Technology to Video Interpolation Viewpoint in Free Viewpoint Video>

An imaging device chiefly including a hardware entity is intended as a camera to be switched in the present embodiment, but as a modification 4, the present embodiment can also regard, as one of the cameras 11, the virtual imaging viewpoint position corresponding to a video interpolation viewpoint generated by the free viewpoint video technology. This makes it possible to apply the present embodiment to a remote video transmission application system that incorporates the free viewpoint video technology, which can switch viewpoints not discretely, but continuously.

Additionally, the complete free viewpoint video technology can optionally generate the camera line. In this case, the camera line sorting unit 193 according to the present embodiment may also perform the sorting processing effectively. For example, if the sorting processing is applied to each predetermined spatial range, and the camera line that is the most suitable for the spatial range is obtained, camera lines are narrowed down to the camera lines corresponding to high-quality viewpoint candidates. This probably implements a viewpoint selection input method having higher operability than that of a viewpoint selection input method used when there are infinite possibilities of viewpoint selection operations.

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

What is claimed is:

1. An information processing device comprising:
   a position acquisition unit configured to acquire a selection position based on a specification of a user in a captured image obtained by imaging a real space;
   a line control unit configured to cause a display unit to display a two-dimensional line obtained by projecting, onto a corresponding position on a display screen of the captured image, a three-dimensional line according to a three-dimensional selection position corresponding to the selection position in a three-dimensional virtual space and a three-dimensional installation position of an imaging device including the three-dimensional selection position within an imaging range; and
   a line sorting unit configured to sort a three-dimensional line on the basis of an evaluation value of the three-dimensional line of each imaging device, when a plurality of imaging devices that include the three-dimensional selection position within the imaging ranges are present, and to cause the display unit to display a two-dimensional line obtained by projecting the sorted three-dimensional line onto the corresponding position on the display screen.

2. The information processing device according to claim 1,
   wherein the line control unit computes the two-dimensional line by projecting the three-dimensional line according to the three-dimensional installation position and the three-dimensional selection position onto the corresponding position on the display screen.

3. The information processing device according to claim 1, comprising:
   a real space information providing unit configured to cause the display unit to display a captured image that is captured by an imaging device corresponding to the two-dimensional line when the two-dimensional line is specified.

4. The information processing device according to claim 3,
   wherein, when a position on the two-dimensional line is further specified as a specification position, the line control unit computes a zoom ratio on the basis of a positional relationship between both end positions of the two-dimensional line and the specification position, and
   wherein the real space information providing unit generates the captured image on the basis of the zoom ratio.

5. The information processing device according to claim 4,
   wherein the line control unit performs predetermined transformation processing according to the specification position on the two-dimensional line, and causes the display unit to display the two-dimensional line on which the transformation processing has been performed.

6. The information processing device according to claim 1,
wherein the line sorting unit computes the evaluation value of each three-dimensional line on the basis of a distance between the three-dimensional selection position and the three-dimensional installation position.

7. The information processing device according to claim 1,
wherein the line sorting unit computes the evaluation value of each three-dimensional line on the basis of an angle formed by the three-dimensional line and a horizontal plane in the three-dimensional virtual space.

8. The information processing device according to claim 1,
wherein the line sorting unit computes the evaluation value of each three-dimensional line on the basis of an imaging quality of the imaging device corresponding to the three-dimensional line.

9. The information processing device according to claim 1,
wherein the line sorting unit causes the display unit to display a two-dimensional line obtained by projecting the sorted three-dimensional line onto the corresponding position on the display screen, and causes the display unit to display a total number of three-dimensional lines.

10. The information processing device according to claim 8,
wherein the line sorting unit acquires the imaging quality of the imaging device by analyzing the captured image that is captured by the imaging device, or acquires the imaging quality of the imaging device on the basis of information embedded in the captured image that is captured by the imaging device.

11. The information processing device according to claim 1,
wherein the line control unit causes the display unit to display the three-dimensional line corresponding to the imaging device in a display manner according to an imaging quality of the imaging device.

12. The information processing device according to claim 1,
wherein the three-dimensional installation position of the imaging device includes a position that allows an interpolation image to be captured, the interpolation image being generated from a captured image of each of a plurality of imaging devices in an interpolative manner.

13. The information processing device according to claim 1,
wherein, when a part of the three-dimensional line is not projected onto an inside of the captured image, the line control unit does not cause the display unit to display a result obtained by projecting the part onto the corresponding position on the display screen.

14. A computer-readable recording medium having a program recorded thereon, the program causing a computer to function as an information processing device including
a position acquisition unit configured to acquire a selection position based on a specification of a user in a captured image obtained by imaging a real space;
a line control unit configured to cause a display unit to display a two-dimensional line obtained by projecting, onto a corresponding position on a display screen of the captured image, a three-dimensional line according to a three-dimensional selection position corresponding to the selection position in a three-dimensional virtual space and a three-dimensional installation position of an imaging device including the three-dimensional selection position within an imaging range; and
a line sorting unit configured to sort a three-dimensional line on the basis of an evaluation value of the three-dimensional line of each imaging device, when a plurality of imaging devices that include the three-dimensional selection position within the imaging ranges are present, and to cause the display unit to display a two-dimensional line obtained by projecting the sorted three-dimensional line onto the corresponding position on the display screen.

15. An information processing method comprising:
acquiring a selection position based on a specification of a user in a captured image obtained by imaging a real space;
causing a display unit to display a two-dimensional line obtained by projecting, onto a corresponding position on a display screen of the captured image, a three-dimensional line according to a three-dimensional selection position corresponding to the selection position in a three-dimensional virtual space and a three-dimensional installation position of an imaging device including the three-dimensional selection position within an imaging range;
sorting a three-dimensional line on the basis of an evaluation value of the three-dimensional line of each imaging device, when a plurality of imaging devices that include the three-dimensional selection position within the imaging ranges are present; and
causing the display unit to display a two-dimensional line obtained by projecting the sorted three-dimensional line onto the corresponding position on the display screen.

* * * * *